US010865922B2

(12) United States Patent
Corbett et al.

(10) Patent No.: US 10,865,922 B2
(45) Date of Patent: Dec. 15, 2020

(54) ANTI-TAMPER PERMANENT QUICK CONNECT COUPLING DEVICE

(71) Applicant: Miniature Precision Components, Inc., Walworth, WI (US)

(72) Inventors: Chris Corbett, Delavan, WI (US); Scott Schwartz, Janesville, WI (US); William Kahabka, Delavan, WI (US); Tyler Walczak, Muskego, WI (US); Brandon Meister, West Allis, WI (US); Brian Schuessler, Lake Geneva, WI (US); Matt Teschendorf, Mukwonago, WI (US); Tim Hammond, Clinton, WI (US)

(73) Assignee: NOVARES US ENGINE COMPONENTS, INC., Walworth, WI (US)

( * ) Notice: Subject to any disclaimer, the term of this patent is extended or adjusted under 35 U.S.C. 154(b) by 385 days.

(21) Appl. No.: 15/725,516

(22) Filed: Oct. 5, 2017

(65) Prior Publication Data

US 2019/0107234 A1 Apr. 11, 2019

(51) Int. Cl.
*F16L 37/098* (2006.01)
*F16L 37/091* (2006.01)
(Continued)

(52) U.S. Cl.
CPC ......... *F16L 37/091* (2013.01); *F16L 37/0987* (2013.01); *F16L 37/0985* (2013.01);
(Continued)

(58) Field of Classification Search
CPC .... F16L 37/0847; F16L 37/0985; F16L 37/12
See application file for complete search history.

(56) References Cited

U.S. PATENT DOCUMENTS 3,245,703 A * 4/1966 Manly ................. F16L 37/0847
285/319
4,673,200 A * 6/1987 Miyauchi ............ F16L 37/0985
285/319
(Continued)

FOREIGN PATENT DOCUMENTS

DE 102005060135 A1 * 7/2007 .......... F16L 37/0985
EP 2228582 A1 9/2010
(Continued)

OTHER PUBLICATIONS

Extended European Search Report dated Feb. 12, 2019 in corresponding European Patent Application No. 18198650.6.

*Primary Examiner* — David Bochna
(74) *Attorney, Agent, or Firm* — Dickinson Wright PLLC

(57) ABSTRACT

A quick connector for permanently locked, non-disconnectable receipt of a tubular male insertion member having a lock feature, and assembly therewith is provided. The connector includes a housing having a tubular wall with inner and outer surfaces extending between opposite ends with a locking feature extending into the inner surface. The inner surface bounds a through bore having an annular shoulder. A retaining member has an annular retainer wall with inner and outer surfaces. The retaining member outer surface is sized for receipt in the through bore of the housing wall. At least one locking member extends radially outwardly from the retainer wall outer surface for lock engagement with the locking feature to prevent relative axial movement between the housing wall and the retaining member. The retainer wall has at least one locking finger extending radially inwardly for locked engagement with the lock feature of the tubular male insertion member.

15 Claims, 14 Drawing Sheets

(51) Int. Cl.
*F16L 37/107* (2006.01)
*F16L 43/00* (2006.01)

(52) U.S. Cl.
CPC ............ *F16L 37/107* (2013.01); *F16L 43/00* (2013.01); *F16L 2201/10* (2013.01); *F16L 2201/20* (2013.01)

(56) References Cited

U.S. PATENT DOCUMENTS

| | | | |
|---|---|---|---|
| 5,193,857 A * | 3/1993 | Kitamura | F16L 37/0985 |
| | | | 285/319 |
| 5,356,181 A | 10/1994 | Shirogane et al. | |
| 5,415,825 A * | 5/1995 | Sellers | F16L 37/0985 |
| | | | 264/262 |
| 5,542,712 A | 8/1996 | Klinger et al. | |
| 5,607,190 A | 3/1997 | Exandier et al. | |
| 5,785,358 A | 7/1998 | Kujawski et al. | |
| 6,340,180 B1 * | 1/2002 | Wisniewski | F16L 37/084 |
| | | | 285/319 |
| 6,402,204 B1 | 6/2002 | Stuart et al. | |
| 6,517,120 B1 * | 2/2003 | Miyajima | F16L 37/0985 |
| | | | 285/305 |
| 6,595,556 B1 | 7/2003 | Zenko et al. | |
| 6,851,721 B2 | 2/2005 | Poder | |
| 7,566,079 B1 | 7/2009 | Callahan et al. | |
| 8,297,659 B2 | 10/2012 | Callahan et al. | |
| 2003/0160448 A1 | 8/2003 | Takayanagi | |
| 2003/0197374 A1 | 10/2003 | Miyajima | |
| 2007/0120362 A1 | 5/2007 | Poder | |
| 2008/0048447 A1 | 2/2008 | Yoshino | |
| 2010/0032937 A1 | 2/2010 | Kerin et al. | |
| 2012/0119485 A1 | 5/2012 | Cichorek et al. | |
| 2014/0125051 A1 * | 5/2014 | Barthel | F16L 37/0985 |
| | | | 285/33 |
| 2014/0284915 A1 | 9/2014 | Arnold et al. | |
| 2015/0145243 A1 * | 5/2015 | Dude | F16L 37/0985 |
| | | | 285/308 |
| 2016/0238171 A1 | 8/2016 | Galfre' | |
| 2017/0152979 A1 | 6/2017 | Klein et al. | |
| 2017/0152980 A1 | 6/2017 | Klein et al. | |
| 2017/0234469 A1 * | 8/2017 | Kondziella | F16L 37/0985 |
| | | | 285/308 |
| 2017/0284583 A1 * | 10/2017 | Eckard | F16L 37/0985 |
| 2017/0299100 A1 * | 10/2017 | Leffler | F16L 37/0985 |
| 2018/0017197 A1 | 1/2018 | Meister et al. | |
| 2019/0049049 A1 * | 2/2019 | Ignaczak | F16L 37/004 |

FOREIGN PATENT DOCUMENTS

JP 2012011797 A 1/2012
WO WO2014019757 A1 2/2014

* cited by examiner

ANTI-TAMPER PERMANENT QUICK CONNECT COUPLING DEVICE

BACKGROUND OF THE INVENTION

1. Field of the Invention

The present disclosure relates generally to a quick connector for establishing a union between conduits, and more particularly to a quick connector for permanently locking a tubular insertion member therein to prevent disassembly of the tubular insertion member therefrom.

2. Related Art

This section provides background information related to the present disclosure which is not necessarily prior art.

As is well known, a type of coupling, commonly referred to as a "quick connector," is used to quickly and simply connect tubes or conduits to one another. Quick connectors connect a tubular insertion member to a receiving member to convey mediums therethrough, such as in a variety of liquid and gas systems, to provide a connection between a pair of conduits for establishing a continuous flow path therebetween. For example, in automotive applications, quick connectors are used in various air/vapor management systems, such as evaporative emissions systems, fuel vapor, oil vapor, crankcase ventilation systems, and brake boost and engine vacuum systems. In addition to these gas management systems, quick connectors can also be used in fluid delivery systems such as, for example, liquid fuel and windshield washer applications. Some of the benefits of present quick connectors in automotive applications include ease of assembly, reduction in potential leak paths, enhanced ability for containment of hydrocarbon emissions, and ability to quickly disconnect the insertion member from the quick connector, such as during service.

Despite the benefits of known quick connectors, a need still exists to provide a mechanism for making a reliable connection between a tubular insertion member and a quick connector without having to employ costly mechanisms to ensure a reliable connection has been established. Current quick connectors require costly electronic sensor mechanisms configured in communication with a vehicle central processing unit to indicate proper connections have been established and are being maintained. Although generally effective, the costs associated therewith can be problematic. Further yet, in some cases the ability to disconnect the insertion member from the quick connector can be problematic. For example, in some applications, such as emissions applications, by way of example and without limitation, tamper resistant connections are desired. In some cases, additional features, such as outer wraps or other types of supplemental features, are disposed about connectors to inhibit ready access to the connectors in an effort to improve their resistance to tampering. However, supplemental features to inhibit access to connectors come at additional cost, both in assembly and in extra component cost.

A quick connector constructed in accordance with the present disclosure and assembly therewith overcomes at least those the problems discussed above, and likely others, which will become readily apparent to one skilled in the art upon viewing the entirety of the disclosure herein.

SUMMARY OF THE INVENTION

This section provides a general summary of the disclosure and is not intended to represent a comprehensive summary of all of its features, advantages, aspects and/or objectives.

It is an aspect of the present disclosure to provide a quick and reliable mechanism in which to ensure a reliable, permanent fluid/gas-tight seal has been established between a plurality of components of a quick connector used to form a fluid/gas-tight connection between conduits. The mechanism includes providing at least one of the components with an integral locking member that forms a permanent connection between components of the quick connector to prevent separation of the components from one another, absent breaking one of the components. Accordingly, a quick connector constructed in accordance with the disclosure assures the "as fully assembled" components of the quick connector will not become detached from one another once assembled to one another. Further, a quick connector and assembly therewith in accordance with the disclosure reduce the complexity of assembling the quick connector into a vehicle, reduce the cost associated with assembly and the total component cost, and prevent tampering of the system including the quick connector.

A quick connector for permanently locked, non-disconnectable receipt of a tubular male insertion member, having a lock feature located between opposite ends, therein to facilitate establishing a tamper-resistant connection between conduits is provided. The quick connector includes a housing having a tubular housing wall with an inner surface and an outer surface extending along a central longitudinal axis between open opposite ends with at least one locking feature extending into the inner surface of the housing wall. The inner surface bounds a through bore and has a shoulder extending radially inwardly from at least a portion thereof. A retaining member has an annular retainer wall with inner and outer surfaces extending axially along the central longitudinal axis between open proximal and distal ends. The outer surface of the retaining member is sized for receipt in the through bore of the housing wall. The retainer wall has at least one locking member extending radially outwardly from the outer surface of the retainer wall for lock engagement with the at least one locking feature in the housing wall to prevent relative axial movement between the housing wall and the retaining member. The retainer wall has at least one locking finger extending radially inwardly from the inner surface of the retainer wall for locked engagement with the lock feature of the tubular male insertion member to prevent removal of the tubular male insertion member from the housing.

In accordance with another aspect of the disclosure, each of the at least one locking features extending into the inner surface of the housing wall can be provided as a through opening sized for receipt of a corresponding one of the at least one locking member of the retaining member therein.

In accordance with another aspect of the disclosure, the at least one locking feature extending into the inner surface of the housing wall can be provided to include a plurality of through openings spaced circumferentially from one another.

In accordance with another aspect of the disclosure, each of the at least one locking member can be provided as a protrusion extending radially outwardly from the annular retainer wall.

In accordance with another aspect of the disclosure, the inner surface of the annular retainer wall can be provided having at least one recessed channel extending axially from the proximal end toward the at least one through opening, with each of the at least one recessed channel being configured to guide a corresponding one of the at least one protrusion axially toward and into the corresponding through opening.

In accordance with another aspect of the disclosure, a ramped surface can be provided to extend radially inwardly from the at least one recessed channel toward the through opening associated therewith to facilitate snapping receipt of a corresponding one of the at least one protrusion into the associated through opening.

In accordance with another aspect of the disclosure, the at least one locking finger can be provided to extend from a fixed end adjacent the proximal end axially toward the distal end of the retaining member.

In accordance with another aspect of the disclosure, the at least one locking finger can be provided as being cantilevered from the fixed end of the retaining member.

In accordance with another aspect of the disclosure, the at least one locking finger can be provided to include a plurality of locking fingers spaced equidistantly from one another about a circumference of the annular retainer wall.

In accordance with another aspect of the disclosure, the at least one locking feature can be provided as a circumferentially extending groove extending radially outwardly into the inner surface of the housing wall.

In accordance with another aspect of the disclosure, the at least one locking member can be provided as a circumferentially extending rib extending radially outwardly from the outer surface of the retainer wall, with the rib being sized for fixed receipt in the groove in the inner surface of the housing wall.

In accordance with another aspect of the disclosure, the circumferentially extending rib can be provided to extend about an entirety of the circumference of the outer surface of the retainer wall.

In accordance with another aspect of the disclosure, a quick connector assembly is provided. The assembly includes a tubular male insertion member having opposite ends with a lock feature located between the opposite ends. The assembly further includes a housing having a tubular housing wall with an inner surface and an outer surface extending about a central longitudinal axis between open opposite ends with at least one locking feature extending into the inner surface of the housing wall. The inner surface of the housing bounds a through bore and has a shoulder extending radially inwardly from at least a portion thereof. The assembly further includes a retaining member having an annular retainer wall with inner and outer surfaces extending axially about the central longitudinal axis between open proximal and distal ends. The outer surface of the retaining member is sized for receipt in the through bore of the housing wall. The retainer wall has at least one locking member extending radially outwardly from the outer surface of the retainer wall for lock engagement with the at least one locking feature in the housing wall to prevent relative axial movement between the housing wall and the retaining member. The retainer wall further includes at least one locking finger extending radially inwardly from the inner surface of the retainer wall for locked engagement with the lock feature of the tubular male insertion member to prevent removal of the tubular male insertion member from the housing.

In accordance with another aspect of the disclosure, the tubular male insertion member of the assembly can be provided having a generally cylindrical outer surface and the lock feature can be provided to extend radially outwardly from the generally cylindrical outer surface.

In accordance with another aspect of the disclosure, the lock feature of tubular male insertion member of the assembly can be provided having an annular collar having a leading shoulder, a trailing shoulder and an outer periphery extending between the leading shoulder and the trailing shoulder.

In accordance with another aspect of the disclosure, the tubular male insertion member of the assembly can be provided having a generally cylindrical outer surface and the lock feature can be provided to extend radially into the generally cylindrical outer surface.

In accordance with another aspect of the disclosure, the lock feature can be provided as an annular recessed groove extending into an outer surface of the tubular male insertion member.

Further areas of applicability of the present invention will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF PRESENTLY PREFERRED EMBODIMENTS

Figure 1A:
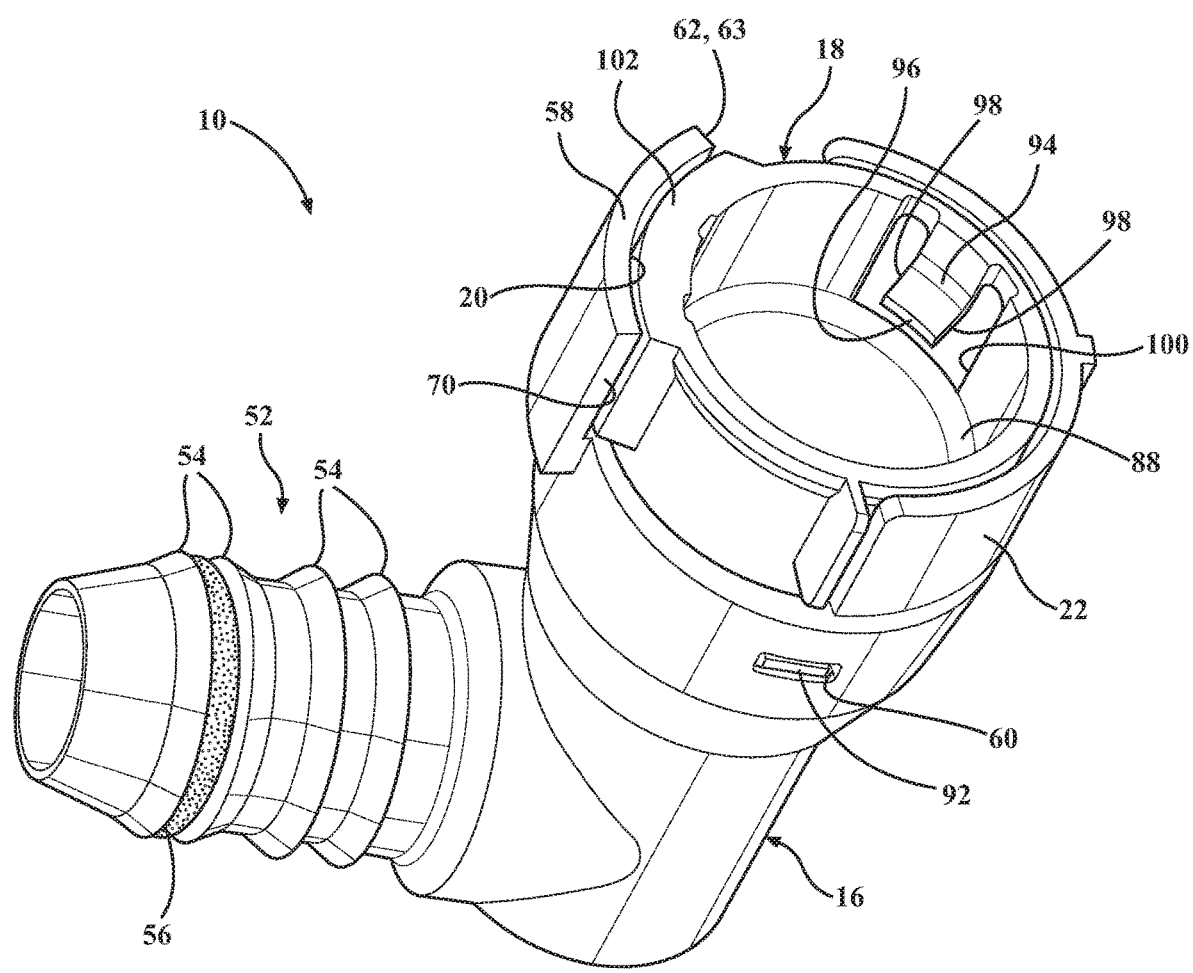
FIG. 1A is an assembled isometric view of a quick connector constructed in accordance with one non-limiting aspect of the disclosure.
Figure 1B:
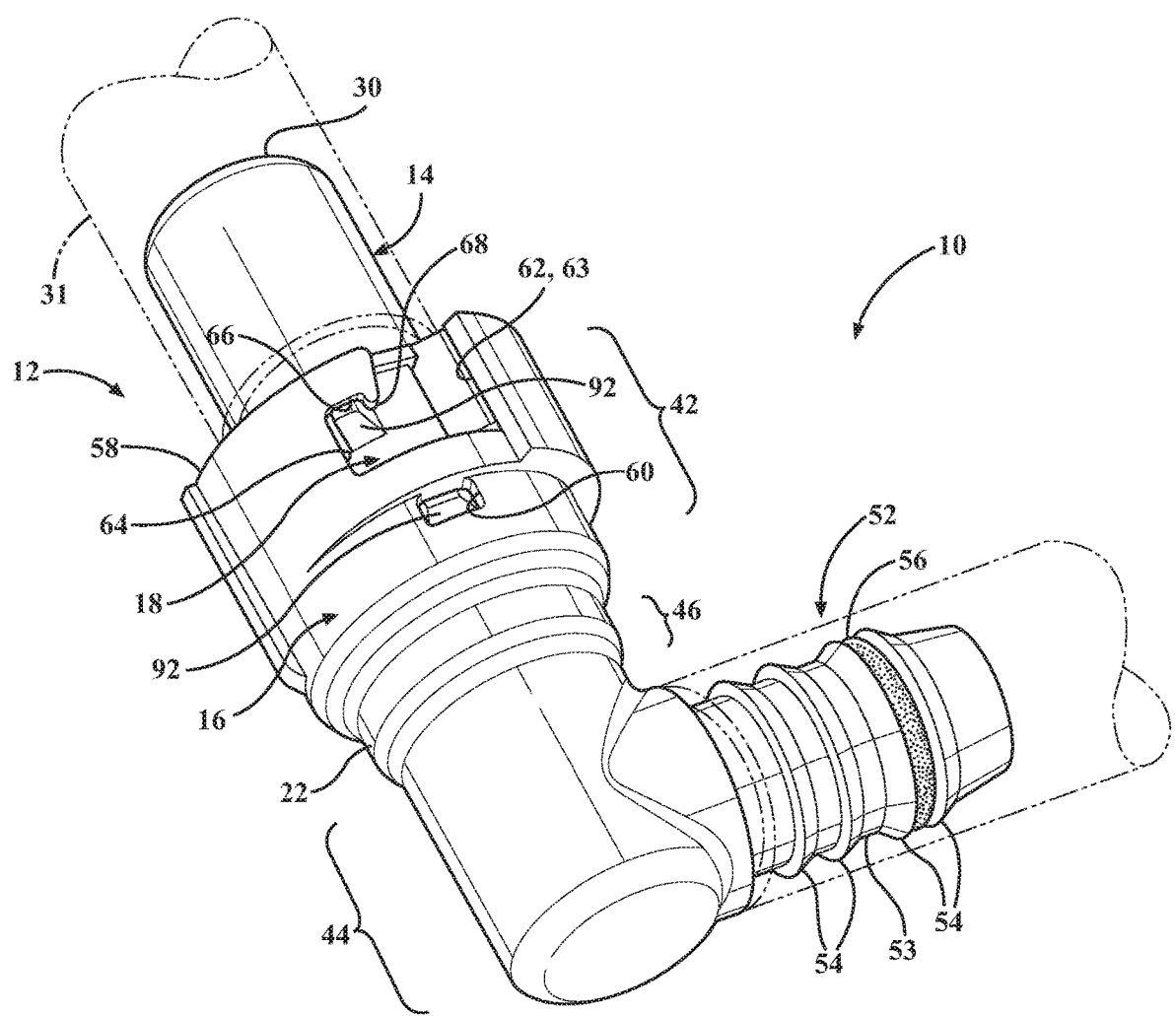
FIG. 1B is another assembled isometric view of the quick connector of FIG. 1A looking from an opposite side of the quick connector with conduits shown in phantom being couple to an insertion member of an assembly thereof.
Figure 2:
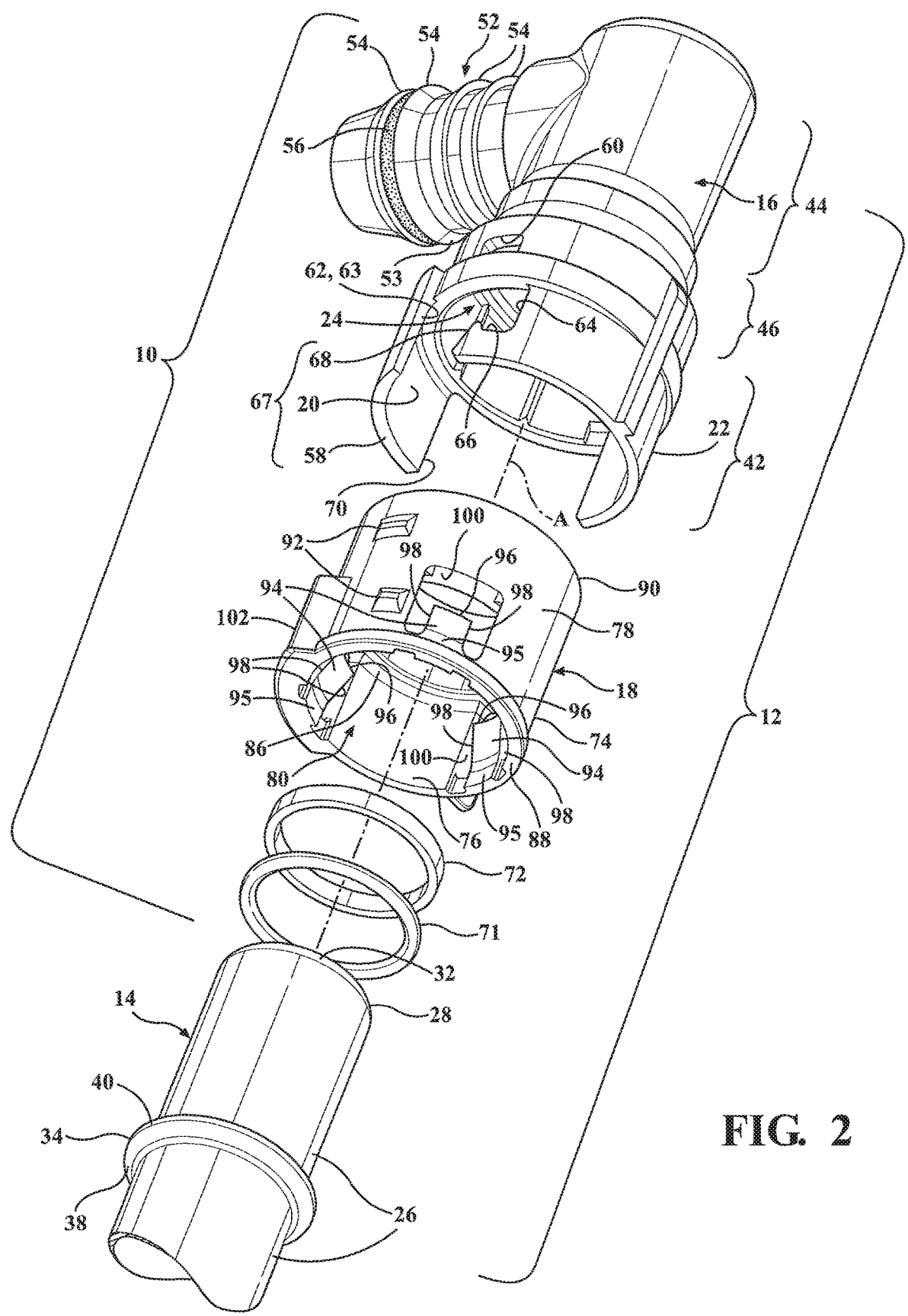
FIG. 2 is an exploded perspective view of the quick connector assembly of FIG. 1B.
Figure 3:
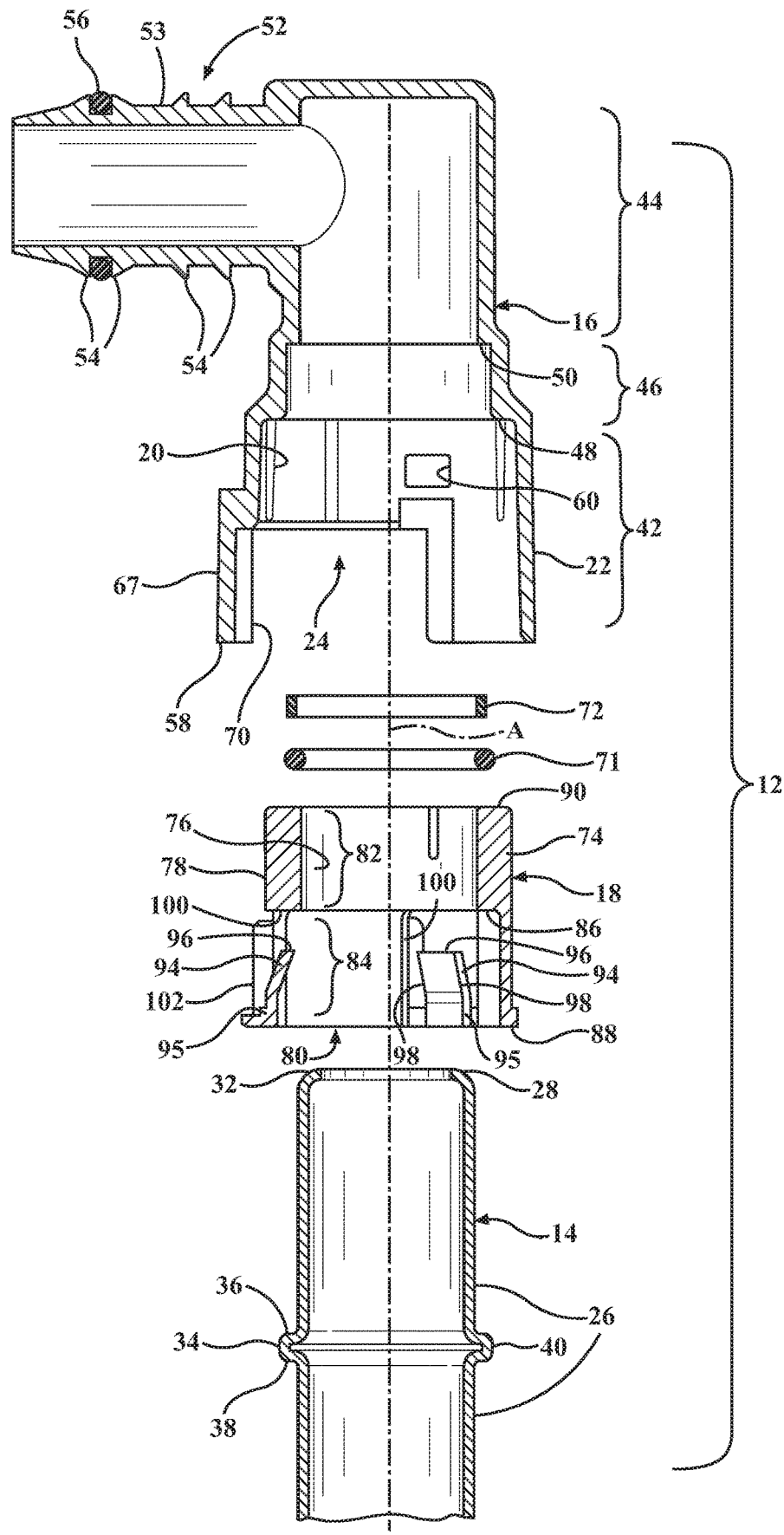
FIG. 3 is an exploded cross-sectional view of the quick connector assembly of FIG. 1B.
Figure 4:
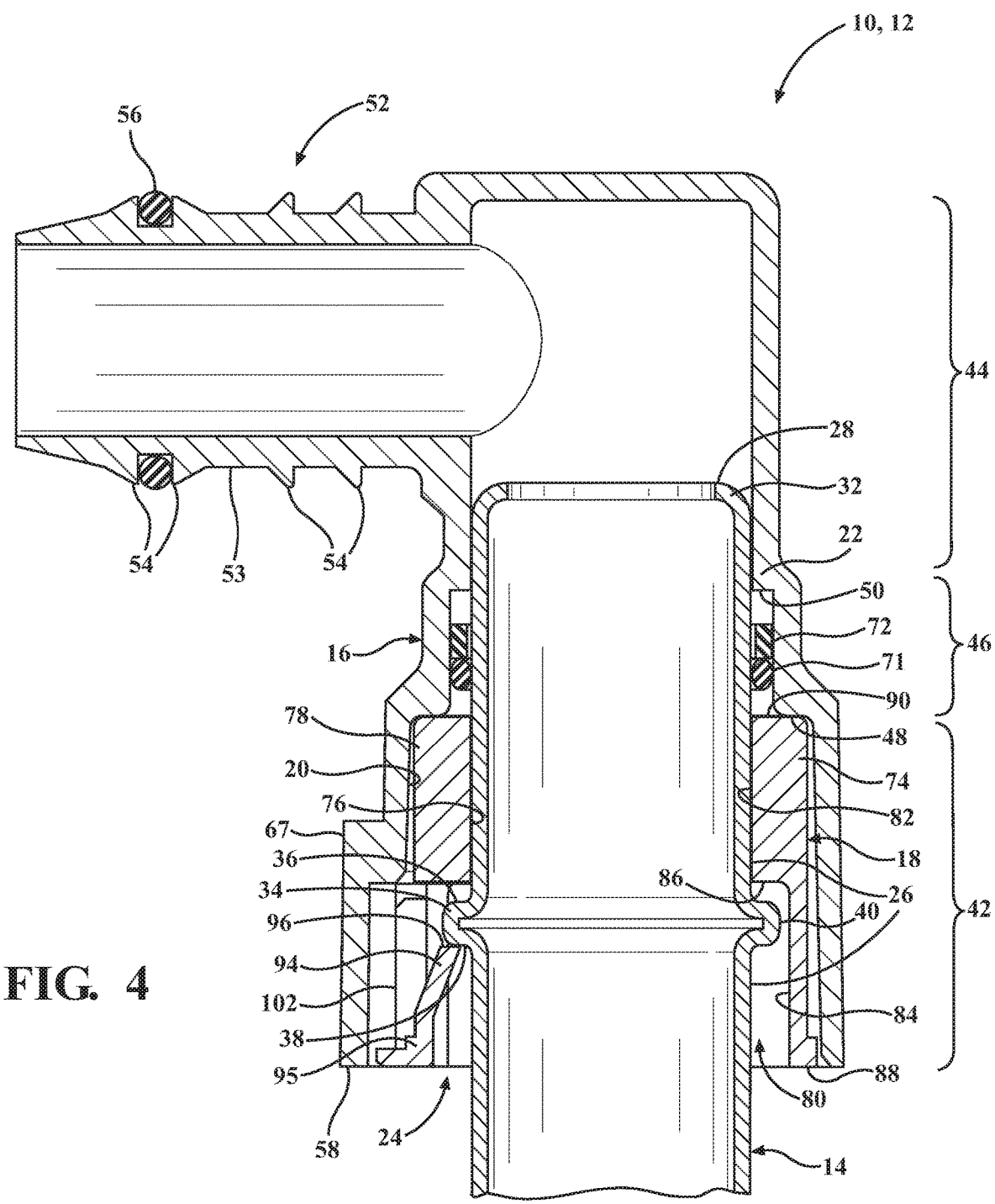
FIG. 4 is an assembled cross-sectional view of the components of FIG. 3.

Referring in general to all of the Figures, the present disclosure and teachings described herein are directed to quick connectors and assemblies therewith, of the type particularly well-suited for providing a fluid/gas tight connection (union) between conduits. While disclosed in accordance with one or more specific exemplary constructions, with particular reference to a first non-limiting embodiment in FIGS. 1A-4, an anti-tamper permanent quick connect coupling device, referred to hereafter simply as quick connector 10, and assembly 12 therewith of the present disclosure is illustrated, while it is to be recognized that a quick connector may be configured other than as expressly shown and described. The inventive concepts disclosed herein are generally directed to an improved mechanism for forming and ensuring a fixed and permanent (without breaking at least one of the components), reliable, fluid/gas-tight connection is made between a tubular male insertion port or member, referred to hereafter simply as insertion member 14, and a tubular receiving member, also referred to as housing 16, of the connector 10 via an intermediate annular retainer, also referred to as retaining member 18, of the connector 10 to form the permanently locked assembly 12. The improved quick connector 10 and assembly 12 provide a reliable, fluid/gas-tight connection in such a manner as to do away with the need for costly supplement features and/or mechanisms to ensure and indicate the permanent, leakproof connection is made and maintained. The connector 10 is economical in manufacture, in assembly and in use, and provides a quick, reliable way in which to ensure a permanent fluid/gas-tight connection is established between conduits and will be maintained between the assembly 12, including the male insertion member 14 and the connector 10, with reassurance that any potential for inadvertent disconnection between the insertion member 14 and the connector 10, and tampering therewith, is prevented.

During assembly, the retaining member 18 is disposed axially along a central longitudinal axis A of the assembly 12, which corresponds to a central longitudinal axis of the individual components 14, 16, 18, within a bore 24 bounded by an inner surface 20 of a generally cylindrical, generally tubular wall 22 of the housing 16. Upon disposing the retaining member 18 into the bore 24 of the housing 16, the retaining member 18 becomes automatically and permanently fixed therein as a result of interlocking features, discussed in more detail below. Then, the tubular insertion member 14 can be inserted generally along the longitudinal axis A into the bore 24 of the housing 16, whereupon the insertion member 14 is brought to a fully assembled state to form the assembly 12, and a permanent fluid/gas-tight seal is perfected between the insertion member 14 and the housing 16 without need for supplemental fixing features and devices. Upon full assembly of the insertion member 14 into the housing 16, the locking features of the insertion member 14 and retaining member 18 operatively couple and cooperate with one another, whether through direct or indirect coupling with one another, to permanently lock the insertion member 14 in sealed engagement with the housing 16. Upon being locked together, assurance is provided that the fluid/gas-tight connection therebetween will be maintained between the insertion member 14 and the housing 16 over the course of the useful life of the assembly 12, without having to employ costly sensor mechanisms in communication with a vehicle control unit, while at the same time doing away with the need to include supplemental fixing members, such as shrink wraps, tape, adhesives and the like, thereby doing away with the need for further fixing members, assembly processes, and thereby avoiding costs associated therewith. Accordingly, the connector 10 and assembly 12 therewith are reliable and cost efficient in assembly and in use.

In accordance with one non-limiting embodiment, the insertion member 14 includes a tubular shaft portion 26 that extends between opposite ends, with one end being an insertion end 28 and the opposite end being an attachment end 30, with the attachment end 30 being configured for operable, whether direct or indirect, attachment to a conduit 31. The insertion end 28 is shown as having a radiused or otherwise chamfered lead-in surface in the form of a generally rounded nose 32 that generally tapers or reduces in diameter to the insertion end 28. The insertion member 14 further includes a lock feature in the form of a collar, shown as being a circumferentially continuous annular collar 34, by way of example and without limitation, between the opposite ends 28, 30. The annular collar 34 extends radially outwardly from a generally cylindrical outer surface (generally is intended herein to mean it can be truly circular as viewed in cross-section or non-circular as viewed in cross-section) of the shaft portion 26 and is generally rectilinear as viewed in axial cross-section. The annular collar 34 has a radially outwardly extending, annular leading shoulder 36 and a radially outwardly extending, annular trailing shoulder 38 spaced from one another by a generally cylindrical outer periphery 40 (FIG. 1), wherein the shoulders 36, 38 extend transversely or about transversely to the axis A. The insertion member 14, as described, is a male conduit member and may be constructed from any desired material known in the art, including plastics, metals, or otherwise, wherein the insertion member 14, in one exemplary embodiment, is a resinous tube.

The housing 16 includes the tubular wall 22, shown as being generally L-shaped, by way of example and without limitation, having an enlarged diameter, cylindrical first receiving portion 42, a reduced diameter, cylindrical second portion 44, with a stepped intermediate diameter cylindrical, third portion 46 extending between the first and second cylindrical portions 42, 44, wherein an internal annular upper shoulder 48 (FIGS. 3 and 4) separates the upper cylindrical first receiving portion 42 from the intermediate cylindrical third portion 46 and an internal annular lower shoulder 50 separates the lower second cylindrical portion 44 from the intermediate third cylindrical portion 46. As such, the relative diameters of the first, second and third portions 42, 44, 46 are such that the respective first diameter is greater than the second and third diameter, and the third diameter is greater than the second diameter: D1>D3>D2, as shown in the Figures.

The tubular wall 22 forms an end nipple portion, also referred to as coupling portion 52, shown as having a plurality of consecutive annular ridges 54 along an outer surface 53 for operable attachment to the conduit 31 (FIG. 1B) and an O-ring 56 captured between a pair of the ridges 54 to facilitate forming a fluid-tight seal with the conduit 31. The enlarged diameter receiving portion 42 extends to an open end 58, with the generally cylindrical wall 22 thereof having at least one, and shown as a plurality (three, by way of example and without limitation) of circumferentially spaced, locking features, shown in a non-limiting embodiments as locking openings 60 extending therethrough. The locking openings 60 are shown as being equidistantly spaced from one another, though it is anticipated that other circumferential spatial relationships are possible.

The first receiving portion 42 of the housing 16 is shown having an additional locking feature, shown as being formed in axially spaced relation from the locking openings 60, and further shown has being formed at an end region of a generally L-shaped slot 62. The L-shaped slot 62 has a first portion 63 that extends axially into the free open end 58, and then a second portion 64 extends laterally or circumferentially to a locking surface 66. The locking surface 66 is shown, by way of example and without limitation, as extending slightly axially upwardly toward the free open end 58, thereby forming an axially recessed anti-rotation feature in the form of an axially extending lip 68.

The first receiving portion 42 of the wall 22 is further shown as having a notch 70 recessed into the free open end 58. The notch 70 is shown as being generally rectilinear and extending axially into the free open end 58 of the first receiving portion 42 to the same or approximately the same axial depth as the L-shaped slot 62, with the depth being between the locking openings 60 and the locking surface 66. The notch 70 is shown as being formed generally diametrically opposite the L-shaped slot 62, though it is to be recognized other circumferential spacial relationships are contemplated herein. A section or sector 67 of the wall 22 extending between the L-shaped slot 62 and the notch 70 is shown as being expanded radially outwardly from the axis A relative to the remaining portion of the receiving portion 42, such that an inner surface of the sector 67 is radially enlarged relative an inner surface of the remaining portion of the receiving portion 42. With the sector 67 forming a slightly enlarged region of the receiving portion 42, a directional installation feature is provided, thereby indicating to an installer during assembly the proper orientation of the retaining member 18 relative to the housing 16, as discussed further below.

The bore 24 of the intermediate portion 46 of the tubular wall 22 is sized diametrically to receive at least one elastomeric annular seal member, shown as an elastomeric O-ring 71 in a close fit, such as a line-to-line, slightly loose, or slight interferences fit. The O-ring 71 has an inner diameter sized to establish a gas/fluid tight seal against the tubular shaft portion 26 of the insertion member 14 upon assembly. An annular spacer sleeve 72 is shown as being seated against or adjacent the lower shoulder 50, with the O-ring 71 being seated against the spacer ring 72, such that the spacer sleeve 72 is between the lower shoulder 50 and the O-ring 71. It should be recognized the seal member 71 could be configured other than as described and shown, as long a gas/fluid-tight seal is formed thereby against the tubular shaft portion 26 of the insertion member 14 upon assembly and while in use.

The retaining member 16 includes a generally annular, tubular retainer wall, and shown as a generally cylindrical wall 74, having an inner surface 76 and an outer surface 78. The inner surface 76 of the wall 74 defines a bore, also referred to as through opening 80. The through opening 80 has a first portion, also referred to as distal or lower portion 82, and a second portion, also referred to as proximal or upper portion 84, with an annular counterbore, also referred to as ledge or shoulder 86, extending therebetween. The lower portion 82 is sized for close fitting receipt of the tubular shaft portion 26 of the insertion member 14 therein, though not the collar 34, while the upper portion 84 is sized for receipt of the collar 34 therein.

The inner and outer surfaces 76, 78 of the retaining member 18 extend about the central longitudinal axis A between opposite open proximal and distal ends 88, 90. The retainer wall 74 has at least one locking member 92, preferably conforming in number with the locking openings 60 in the housing 16, and further includes an additional locking member 92 for receipt against the locking surface 66. The locking members 92 are arranged for alignment with and configured for receipt within the locking openings 60 in the housing 16 and against the locking surface 66 upon completing assembly of the retaining member 18 into the housing 16. The locking members 92 extend radially outwardly from the outer surface 78 sufficiently for locked receipt within the locking openings 60 and for locked abutment against the locking surface 66. The locking members 92, shown as radially outwardly extending, generally pyramid-shaped or frustroconical-shaped protrusions, by way of example and without limitation, can be formed as a monolithic piece of material with the retainer member 18, and can be formed having other shapes than shown.

The retainer wall 74 further includes at least one, and shown as a plurality of locking fingers 94 extending radially inwardly from the inner surface 76, wherein the locking fingers 94 are configured for locked engagement with the collar 34 of the insertion member 14. The locking fingers 94 are shown as being spaced equidistantly from one another about the circumference of the wall 74, with three, by way of example and without limitation, being shown. The locking fingers 94 are shown as extending from a fixed end 95 adjacent the proximal end 88 along an axially and radially inwardly extending inclination toward the distal end 90 to free ends 96. Accordingly, the locking fingers 94 converge toward one another and toward the central longitudinal axis A. The locking fingers 94 are cantilevered from their fixed ends 95, and thus, have opposite free sides 98 that extend from the fixed ends 95 to the free ends 96. As such, the locking fingers 94 are substantially detached from the wall 74, other than at their fixed ends 95, and are surrounded by respective openings 100 in the wall 74. The locking fingers 94 extend radially inwardly to an extent that the free ends 96 confront the collar 34 along an axial direction to prevent removal of the insertion member 14 upon assembly of the insertion members 14 through the retaining member 18 and into the housing 16, as discussed further below. The locking fingers 94 can further be formed to extend radially inwardly sufficiently to abut the tubular shaft portion 26 of the insertion member 14, if desired.

The retainer wall 74 further includes a protuberance 102 extending radially outwardly from the outer surface 78 adjacent the proximal end 88. The protuberance 102 is sized for receipt within the radial region spanned by the housing sector 67, and is configured having the same or about the same peripheral shape as the sector 67. As such, with the protuberance 102 extending radially outwardly from the remainder of the outer surface 78, the protuberance and the sector 67 cooperate to provide a key-like fit with one another, such that the protuberance 102 must be axially aligned with the sector 67 during assembly, otherwise, the protuberance 102 will not fit within the open end 58 of the housing receiving portion 42. Accordingly, the sector 67 and protuberance 102 cooperate with one another to ensure the locking features, including the locking members 92, are properly aligned axially for receipt within the corresponding locking openings 60 in the wall 22 of the housing 16 during insertion of the retaining member 18 into the housing 16, thereby simplifying assembly and ensuring the retaining member 18 is properly fixed in locked engagement with the housing 16.

In assembly, with the spacer sleeve 72 disposed against or adjacent the lower shoulder 50 and the O-ring 71 disposed against the spacer sleeve 72, the protuberance 102 of the retaining member 18 is axially aligned with the sector 67 of the housing 16 and the retaining member 18 is disposed axially into the receiving portion 46 of the housing 16 along the longitudinal central axis A. Upon reaching the assembled state, the locking members 92 adjacent the distal end 90 snap into the respective locking openings 60 and the locking member 92 adjacent the proximal end 88 snaps into position against the locking surface 66. It is to be recognized that the interference between the locking members 92 and the inner surface 20 of the housing 16 causes the wall 74 of the retaining member 18 to flex elastically in a radially inward direction, thereby allowing the locking members 92 to temporarily deflect radially inwardly until they register with the respective locking opening 60 and L-shaped slot 62, whereupon the wall 74 and the locking members 92 automatically spring resiliently outwardly to an unbiased state. As such, the retaining member 18, with the locking members 92 disposed and fixed within the locking openings 60 and against the locking surface 66, is prevented from being removed from the housing 16.

Then, with the retaining member 18 fixed in the assembled state within the housing 16, the insertion member 14 is disposed axially along the axis A, through the through opening 80 of the retaining member 18, into the housing 16. The insertion end 28 of the insertion member 14 is inserted through the O-ring 71 and into the second portion 22 of the housing 16, wherein the O-ring 71 is radially compressed between the housing 16 and the tubular shaft portion 26 of the insertion member 28 to form a gas/fluid-tight seal therebetween. Additionally, the outer periphery 40 of the collar 34 gradually depresses the locking fingers 94 to bias the locking fingers 94 resiliently and radially outwardly. Upon the collar 34 being moved axially beyond the free ends 96 of the locking fingers 94, the locking fingers 94 automatically snap resiliently and preferably audibly radially inwardly, whereupon the free ends 96 are brought into position to confront the trailing shoulder 38 of the collar 34 against return axial movement outwardly from the retaining member 18, while the leading shoulder 36 of the collar 34 is brought into abutment or close proximity with the shoulder 86 of the retaining member 18. Accordingly, the collar 34 is permanently and substantially captured against axial movement between the shoulder 86 and the locking fingers 94. Of further importance is the close fit of the tubular shaft portion 26 against the inner surface 76 of the retaining member lower portion 82, thereby preventing the radially inward deflection of the locking members 92, and thus, assuring the locking members 92 remain fixed in locked receipt within the locking openings 60.

If any axially applied force is applied between the insertion member 14 and the housing 16, tending to bias the insertion member 14 axially outwardly from the housing 16, the free ends 96 of the radially inwardly extending locking fingers 94 confront and abut the trailing shoulder 38, whereupon the pressure applied against the free ends 96 and along the axially extending inclined length of the fingers 94 tends to bias the locking fingers 94 further radially inwardly, due to their being inclined radially inwardly, thereby further locking the insertion member 14 against removal. Accordingly, reassurance is provided that the locked connection is maintained between the insertion member 14 and the housing 16, even under axially applied tensile forces tending to bias the insertion member 14 axially outwardly from the housing 16, and as such, upon completing the assembly 12 as discussed and shown, no additional assurances, such as sensors, supplemental retainer mechanisms and the like, are needed to ensure the connection is established and permanently maintained.

Figure 5:
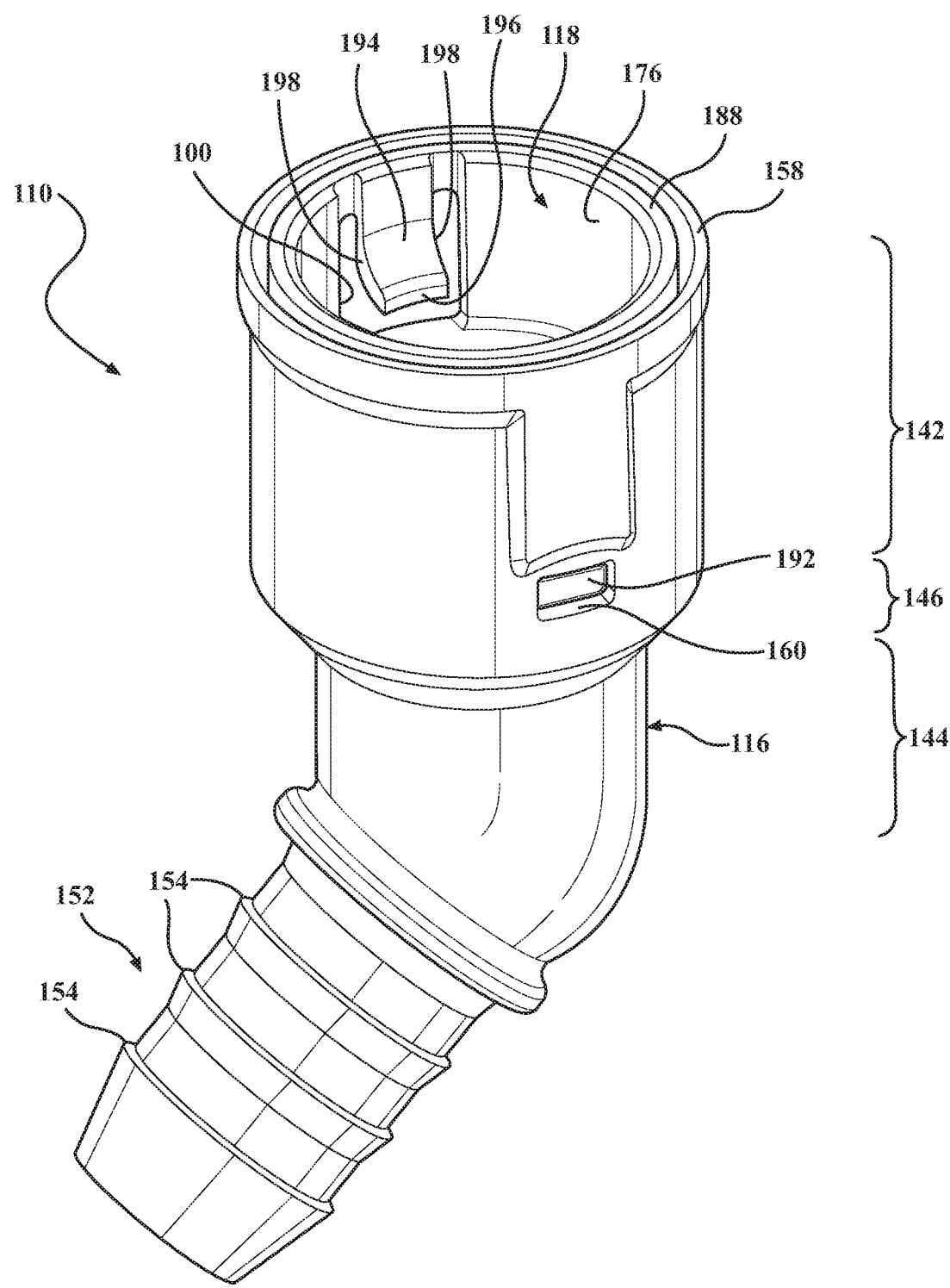
FIG. 5 is an assembled isometric view of a quick connector constructed in accordance with another non-limiting aspect of the disclosure.
Figure 6:
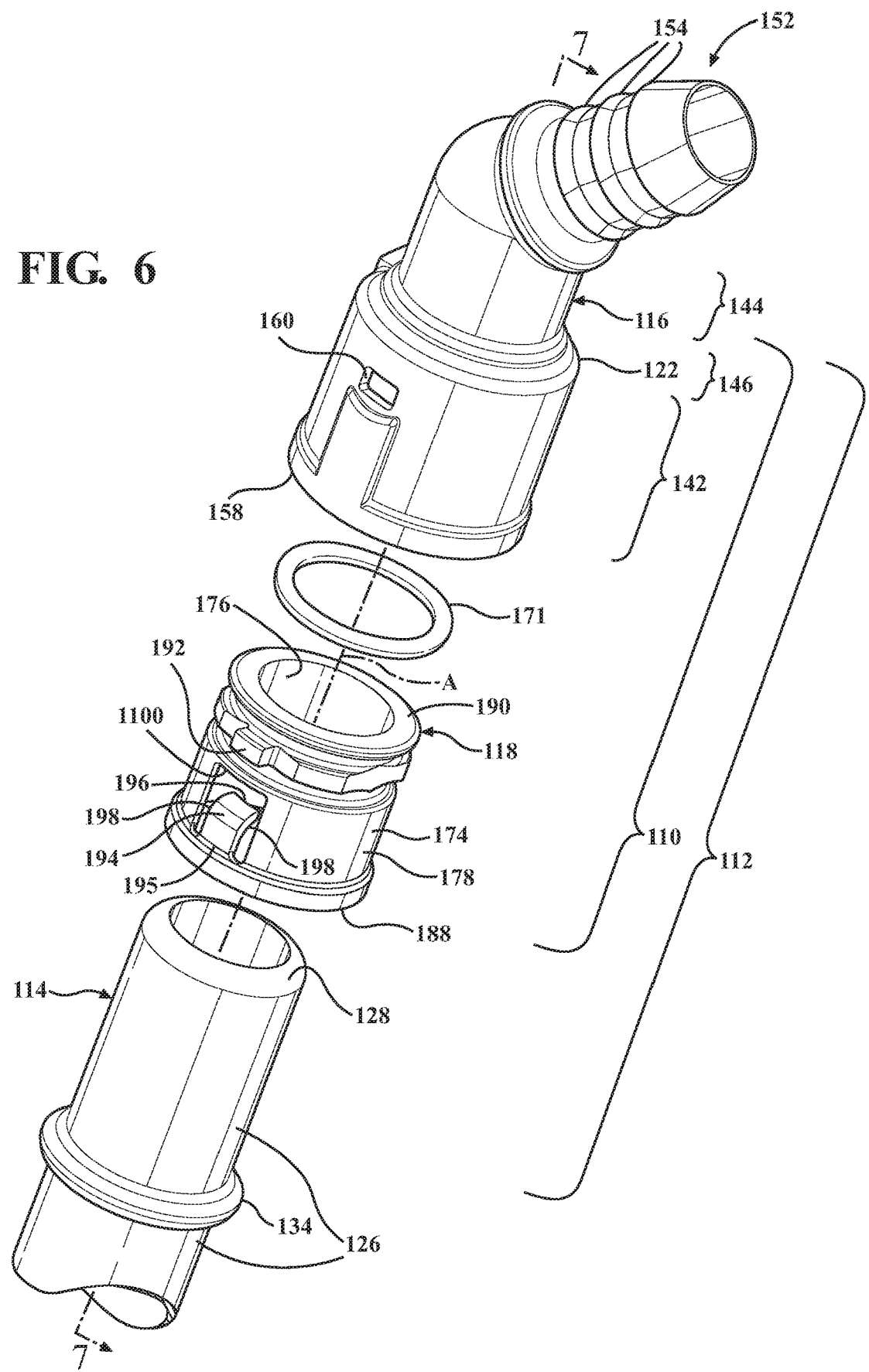
FIG. 6 is an exploded perspective view of the quick connector of FIG. 5 with an insertion member forming an assembly therewith.
Figure 7:
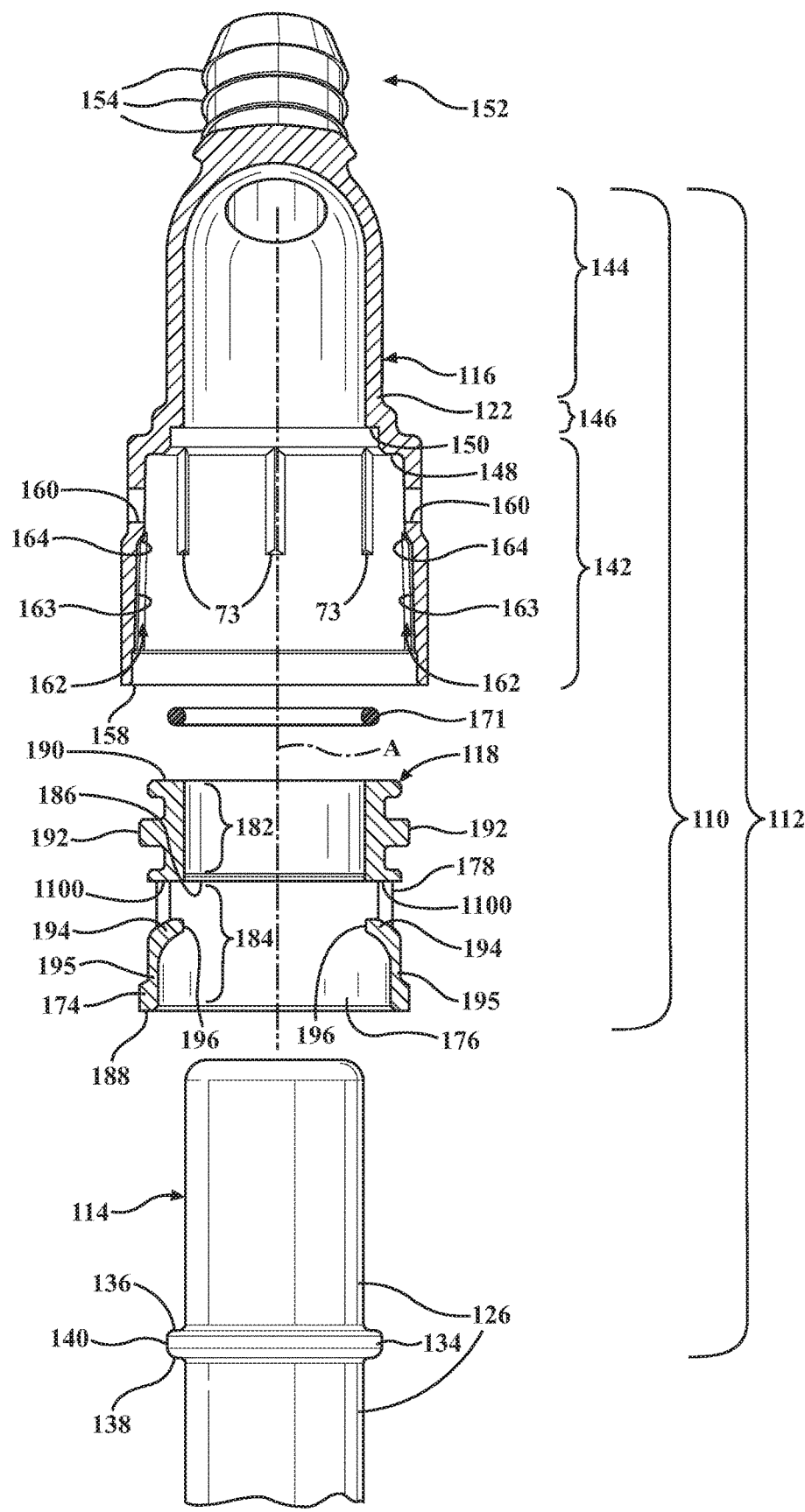
FIG. 7 is an exploded partial cross-sectional view of the quick connector assembly of FIG. 6 taken generally along the line 7-7 of FIG. 6 with the insertion member shown in a non-cross-sectioned state.
Figure 8:
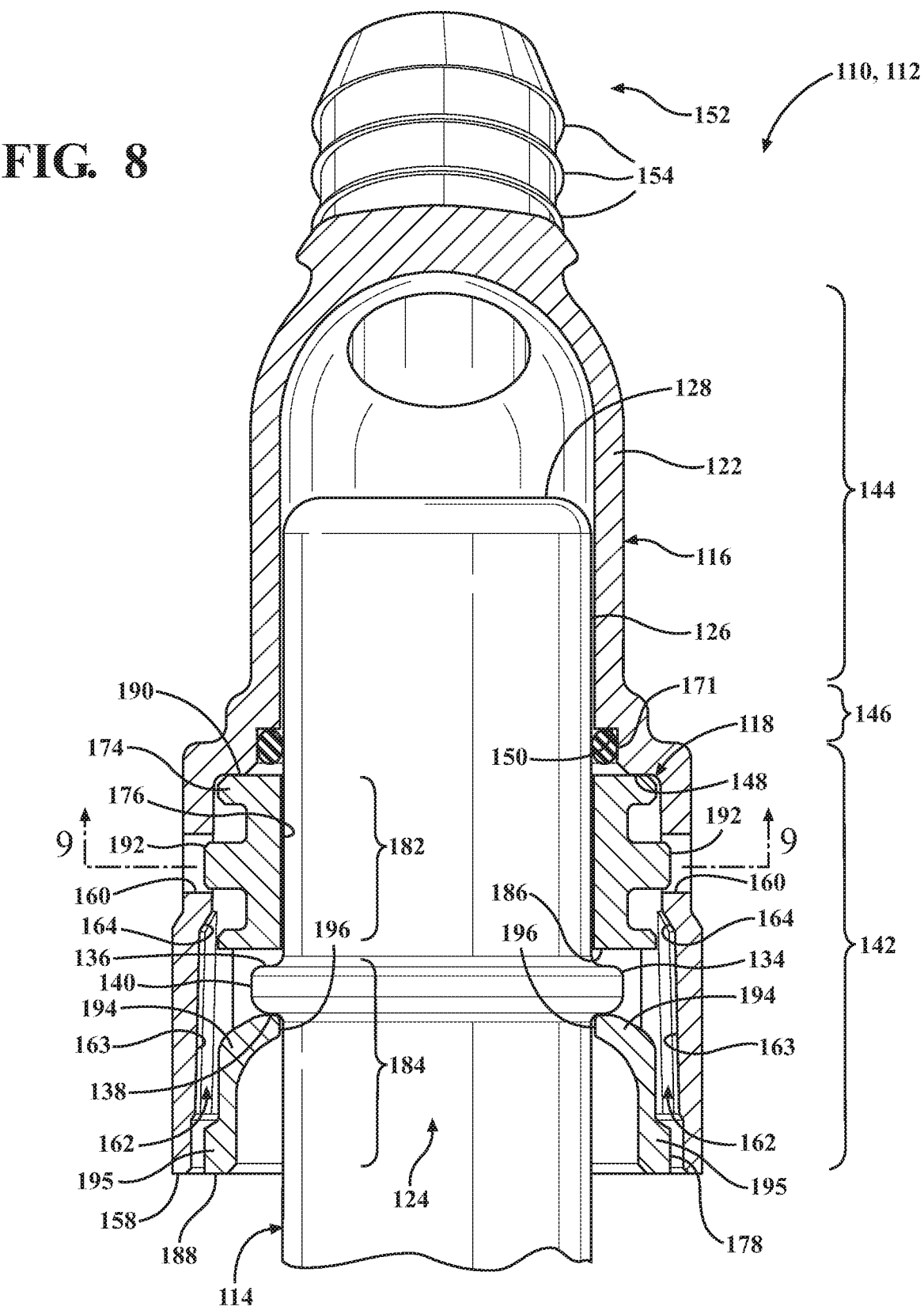
FIG. 8 is an assembled cross-sectional view of the components of FIG. 7 with the insertion member shown in a non-cross-sectioned state.
Figure 9:
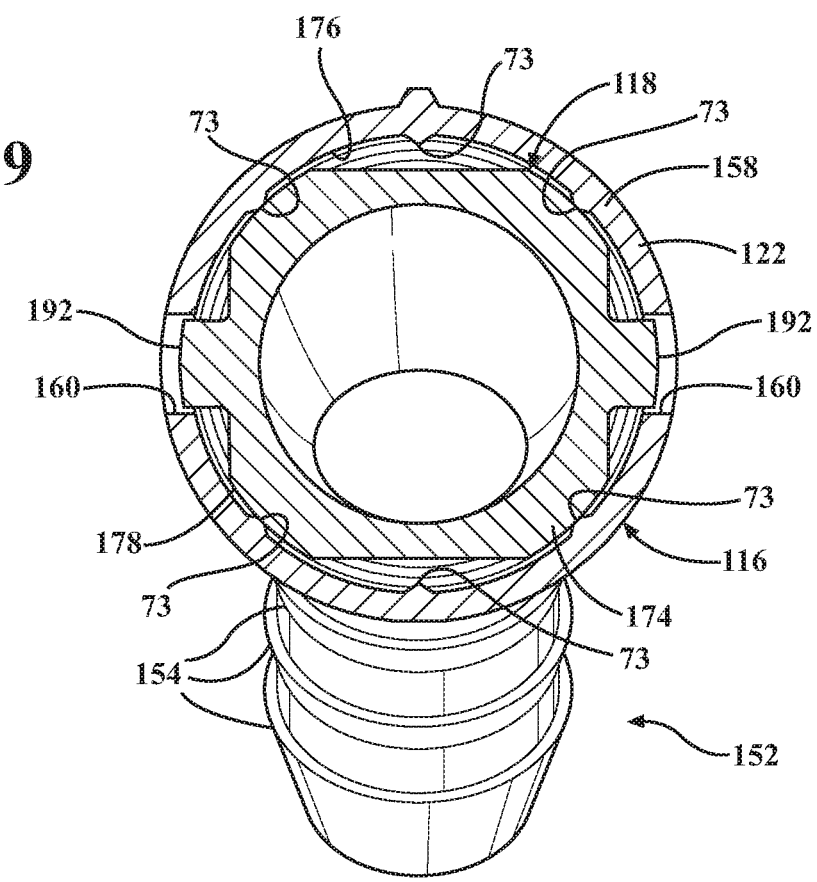
FIG. 9 is an assembled cross-sectional view of the quick connector of FIG. 5 taken through a locking member of the connector.
Figure 10:
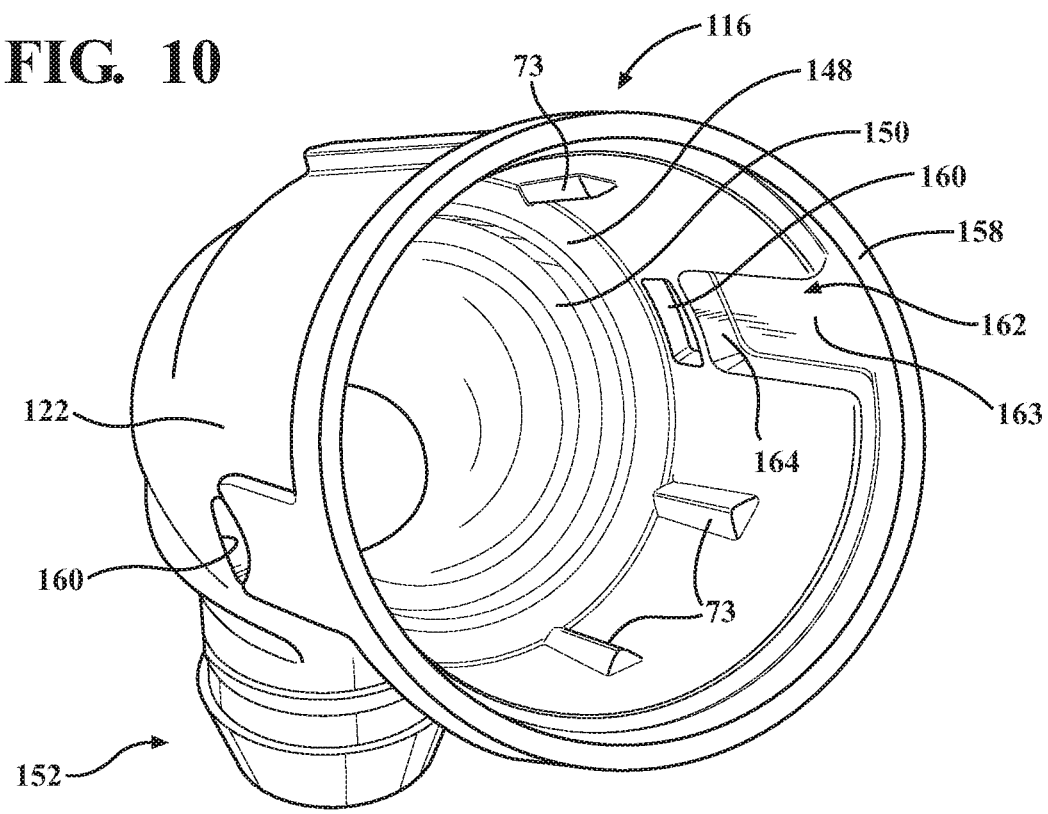
FIG. 10 is an isometric view of a housing of the quick connector of FIG. 5.

In FIGS. 5-10, another quick connector 110 or components thereof are illustrated in accordance with another non-limiting embodiment of the disclosure, wherein the same reference numerals, offset by a factor of 100, are used to identify like parts and features. The quick connector 110 provides a reliable, fluid/gas-tight connection between an insertion member 114 and a housing 116 via an intermediate retaining member 118 and a resilient annular seal, such as an O-ring 171, similarly as discussed above. Accordingly, the improved quick connector 110 does away with the need for costly supplemental features and/or mechanisms to ensure and indicate the permanent, leak-proof connection is made and maintained. The connector 110 is economical in manufacture, in assembly and in use, and provides a quick, reliable way in which to ensure a permanent fluid/gas-tight connection is established between conduits and will be maintained between the male insertion member 114 and the housing 116, with reassurance that any potential for inadvertent disconnection therebetween, and tampering therewith, is prevented.

The tubular insertion member 114 is the same or substantially the same as discussed above for the insertion member 14, including a tubular shaft portion 126 and an annular collar 134 intermediate opposite insertion and attachment ends 128, 130. The annular collar 134 includes leading and trailing shoulders 136, 138 and an outer periphery 140 as discussed above for the collar 34. Accordingly, further discussion of the insertion member 114 is believed unnecessary, as one possessing ordinary skill in the art will readily appreciate and understand the similarities with insertion member 14.

The housing 116 includes a tubular wall 122 having an enlarged diameter, cylindrical first receiving portion 142, a reduced diameter, cylindrical second portion 144, with an intermediate diameter cylindrical, third portion 146 extending between the first and second cylindrical portions 142, 144. An internal annular upper shoulder 148 (FIGS. 7 and 8) separates the upper cylindrical first receiving portion 142 from the intermediate cylindrical third portion 146 and an internal annular lower shoulder 150 separates the lower second cylindrical portion 144 from the intermediate third cylindrical portion 146.

The tubular wall 122 has a coupling portion 152 including a plurality of axially spaced annular ridges 154 for operable attachment to a conduit 131. The enlarged diameter receiving portion 142 extends to an open end 158, with the generally cylindrical wall 122 thereof having at least one, and shown as a pair, by way of example and without limitation, of circumferentially spaced, locking features, shown in a non-limiting embodiment as locking openings 160 extending therethrough. The locking openings 160 are shown as being spaced axially from the free open end 158 and being circumferentially spaced from one another in diametrically opposed relation with one another, though it is anticipated that other circumferential spatial relationships are possible.

The first receiving portion 142 of the housing 116 is shown having an additional feature to facilitate guided receipt of a locking member of the retaining member 118 therein, shown as being recessed slots, also referred to as channels 162, extending axially from the free open end 158 to or adjacent to the locking openings 160. The channels 162 are shown as each having a first portion 163 that extends radially outwardly, in recessed fashion, into an inner surface of the wall 122, and a second portion 164 forming a radially inwardly extending ramped locking surface 166 immediately adjacent the respective locking opening 160. The ramped surfaces 166 extend from the corresponding recessed channel 162 to the through openings 160 to facilitate snapping receipt of the respective locking members into the through openings 160.

The bore 124 of the intermediate portion 146 of the tubular wall 122 is sized diametrically to receive at least one elastomeric annular seal member, shown as the elastomeric O-ring 171 in a close fit, such as a line-to-line, slightly loose, or slight interferences fit. The O-ring 171 is sized as discussed above to establish a gas/fluid tight seal against the tubular shaft portion 126 of the insertion member 114 upon assembly. The bore 124 is further shown having a plurality of guide features 73, shown as elongate, axially extending ribs, to facilitate maintaining the retaining member 118 in its proper concentric position within the housing 116 upon be disposed therein. The guide features 73 can be provided to have a line-to-line or slightly loose fit with the outer surface 178 of the retaining member 118.

The retaining member 118 includes a generally annular, tubular retainer wall, and shown as a generally cylindrical wall 174, having an inner surface 176 and an outer surface 178. The inner surface 176 of the wall 174 defines a bore, also referred to as through opening 180. The through opening 180 has a first portion, also referred to as distal or lower portion 182, and a second portion, also referred to as proximal or upper portion 184, with an annular counterbore, also referred to as ledge or shoulder 186, extending radially therebetween. The lower portion 182 is sized for close fitting receipt of the tubular shaft portion 126 of the insertion member 114 therein, though not the collar 134, while the upper portion 184 is sized for receipt of the collar 34 therein.

The inner and outer surfaces 176, 178 of the retaining member 118 extend axially about the central longitudinal axis A between opposite open proximal and distal ends 188, 190. The retainer wall 174 has at least one locking member 192, preferably conforming in number with the locking openings 160 in the housing 116. The locking members 192 are arranged for alignment with and for receipt within the channels 162 and are and further configured for snapping receipt within the locking openings 160 in the housing 116. The locking members 192 extend radially outwardly from the outer surface 178 sufficiently for snapping, locked receipt within the locking openings 160. The locking members 192, shown as radially outwardly extending, generally rectilinear-shaped protrusions, by way of example and without limitation, can be formed as a monolithic piece of material with the retainer member 118, and can be formed having other shapes than shown.

The retainer wall 174 further includes at least one, and shown as a plurality of locking fingers 194 extending radially inwardly from the inner surface 176, wherein the locking fingers 194 are configured for locked engagement against the collar 134 of the insertion member 114. The locking fingers 194 are shown as being spaced equidistantly from one another about the circumference of the wall 174, with two, by way of example and without limitation, being shown in diametrically opposed relation with one another. The locking fingers 194 are shown as extending along an arcuate path from a fixed end 195 adjacent the proximal end 188 along an axially and radially inwardly extending direction toward the distal end 190 to free ends 196. Accordingly, the locking fingers 194 converge toward one another and toward the central longitudinal axis A. The locking fingers 194 are cantilevered from their fixed ends 195, and thus, have opposite free sides 198 that extend from the fixed ends 195 to the free ends 196. As such, the locking fingers 194 are substantially detached from the wall 174, other than at their fixed ends 195, and are surrounded by respective openings 1100 in the wall 174. The locking fingers 194 extend radially inwardly to an extent that the free ends 196 confront the collar 134 along an axial direction to prevent removal of the insertion member 114 upon assembly of the insertion members 114 through the retaining member 118 and into the housing 116, as discussed further below. The locking fingers 194 can further be formed to extend radially inwardly sufficiently to abut the tubular shaft portion 126 of the insertion member 114, if desired.

In assembly, with the O-ring 171 disposed against or adjacent the lower shoulder 150, the locking members 192 of the retaining member 118 are axially aligned with the channels 162 of the housing 116 and the retaining member 118 is disposed axially into the receiving portion 146 of the housing 116 along the longitudinal central axis A. The locking members 192 are received and guided axially within the first portions 163 of the channels 162, and upon reaching the radially inwardly extending second portions 164, the locking members 192 interfere slightly with the second portions 164 to cause resilient and elastic deformation of the housing wall 122 and/or retaining member wall 174, thereby allowing the locking members 192 to deflect over the second portions 164 for snapping receipt to an assembled state within the locking openings 160. As such, the retaining member 118, with the locking members 192 disposed and fixed within the locking openings 160, is prevented from being removed from the housing 116.

Then, with the retaining member 118 fixed in the assembled state within the housing 116, the insertion member 114 is disposed axially along the axis A, through the retaining member 118, into the housing 116. The insertion end 128 of the insertion member 114 is inserted through the O-ring 171 and into the second portion 122 of the housing 116, wherein the O-ring 171 is radially compressed between the housing 116 and the tubular shaft portion 126 of the insertion member 128 to form a gas/fluid-tight seal therebetween. Additionally, the leading shoulder 136 and the outer periphery 140 of the collar 134 deflect the locking fingers 194 to resiliently bias the locking fingers 194 radially outwardly. Then, upon the collar 134 being moved axially beyond the free ends 196 of the locking fingers 194, the locking fingers 194 automatically snap resiliently radially inwardly, whereupon the free ends 196 are brought into position to confront the trailing shoulder 138 of the collar 134 against return axial movement outwardly from the retaining member 118, while the leading shoulder 136 of the collar 134 is brought into abutment or close proximity with the shoulder 186 of the retaining member 118. Accordingly, the collar 134 is permanently captured between the shoulder 186 and the locking fingers 194. Further, the close fit of the tubular shaft portion 126 against the inner surface 176 of the retaining member lower portion 182 prevents the inward deflection of the locking members 192, thereby assuring the locking members 192 remain fixed in locked receipt within the locking openings 160 and against unwanted removal therefrom.

If any axially applied force is applied between the insertion member 114 and the housing 116, tending to bias the insertion member 114 axially outwardly from the housing 116, the free ends 196 of the radially inwardly extending locking fingers 194 confront and abut the trailing shoulder 138. The pressure applied against the free ends 196 and along the axially extending length of the fingers 194 tends to bias the locking fingers 194 further radially inwardly, which is promoted by the radially inwardly arced shape of the locking fingers 194, which provides the locking fingers 194 with a convex surface facing radially inwardly, acting to further bend the fingers 194 radially inwardly and lock the insertion member 114 against removal from the housing 116. Accordingly, reassurance is provided that the locked connection is maintained between the insertion member 114 and the housing 116, even under axially applied forces tending to bias the insertion member 114 axially outwardly from the housing 116. As such, no additional assurances, such as sensors, secondary fixing members and the like, are needed to ensure the connection is made and maintained.

Figure 11:
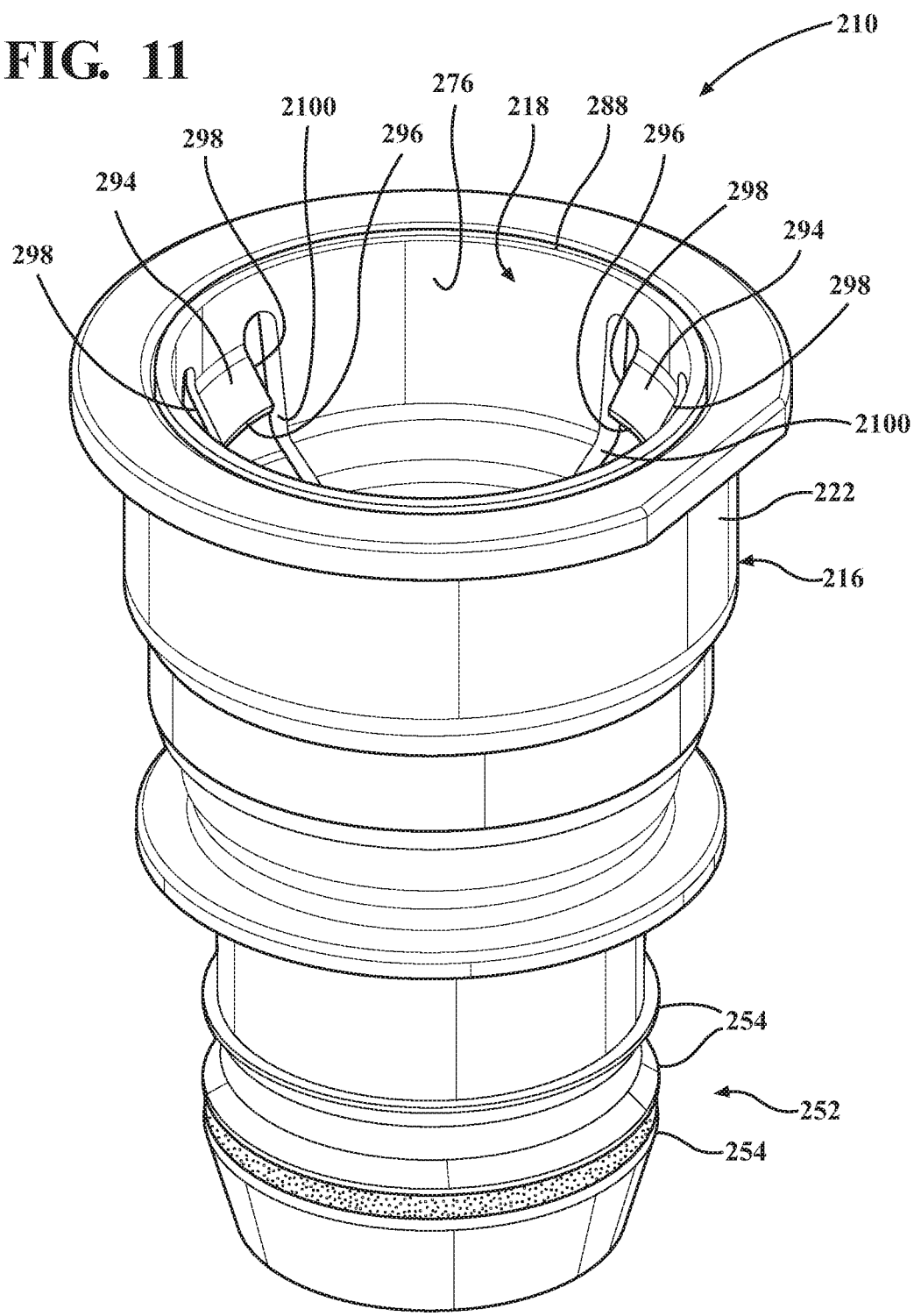
FIG. 11 is an assembled isometric view of a quick connector constructed in accordance with yet another non-limiting aspect of the disclosure.
Figure 12:
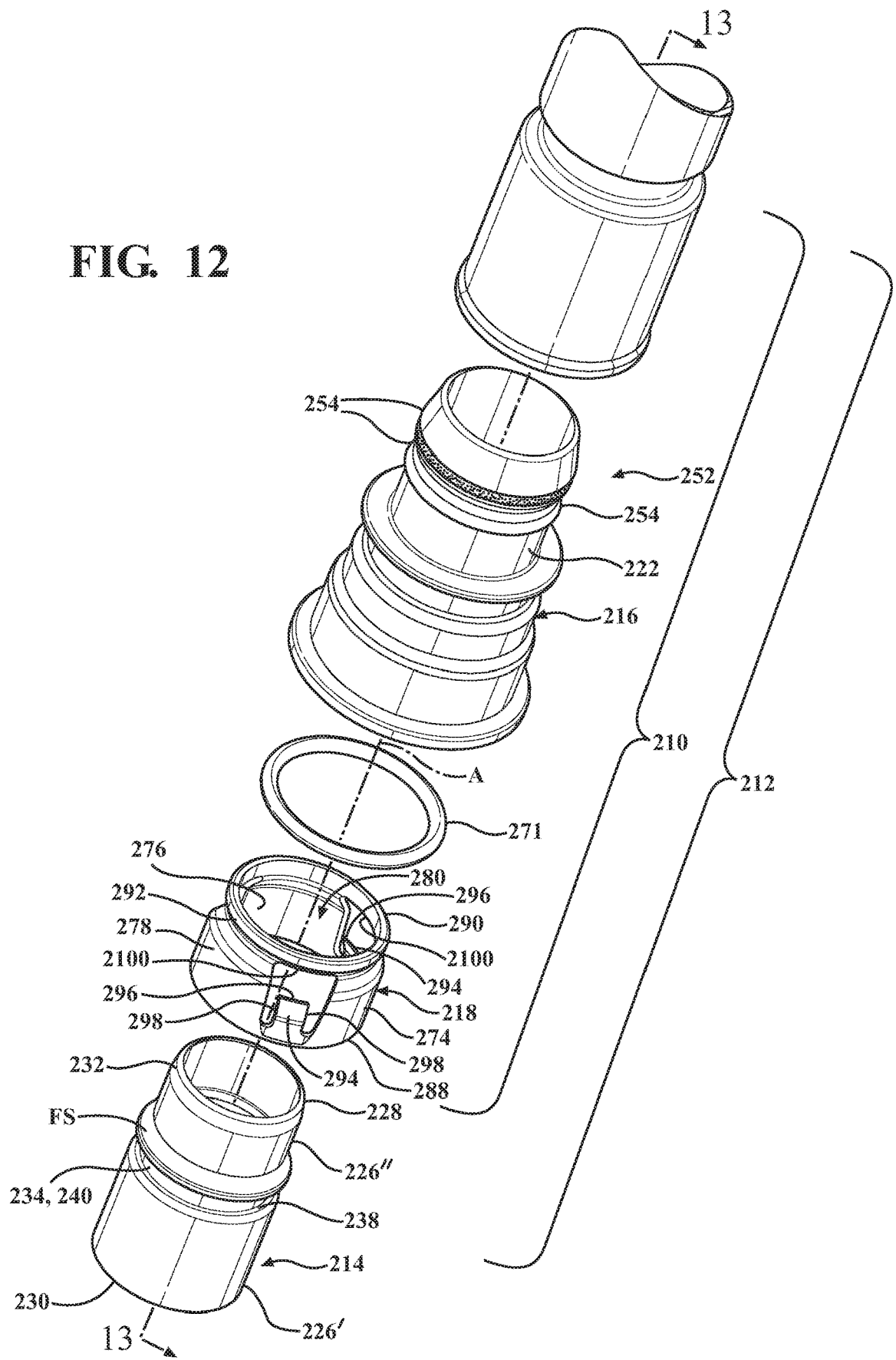
FIG. 12 is an exploded perspective view of the quick connector of FIG. 11 with an insertion member forming an assembly therewith.
Figure 13:
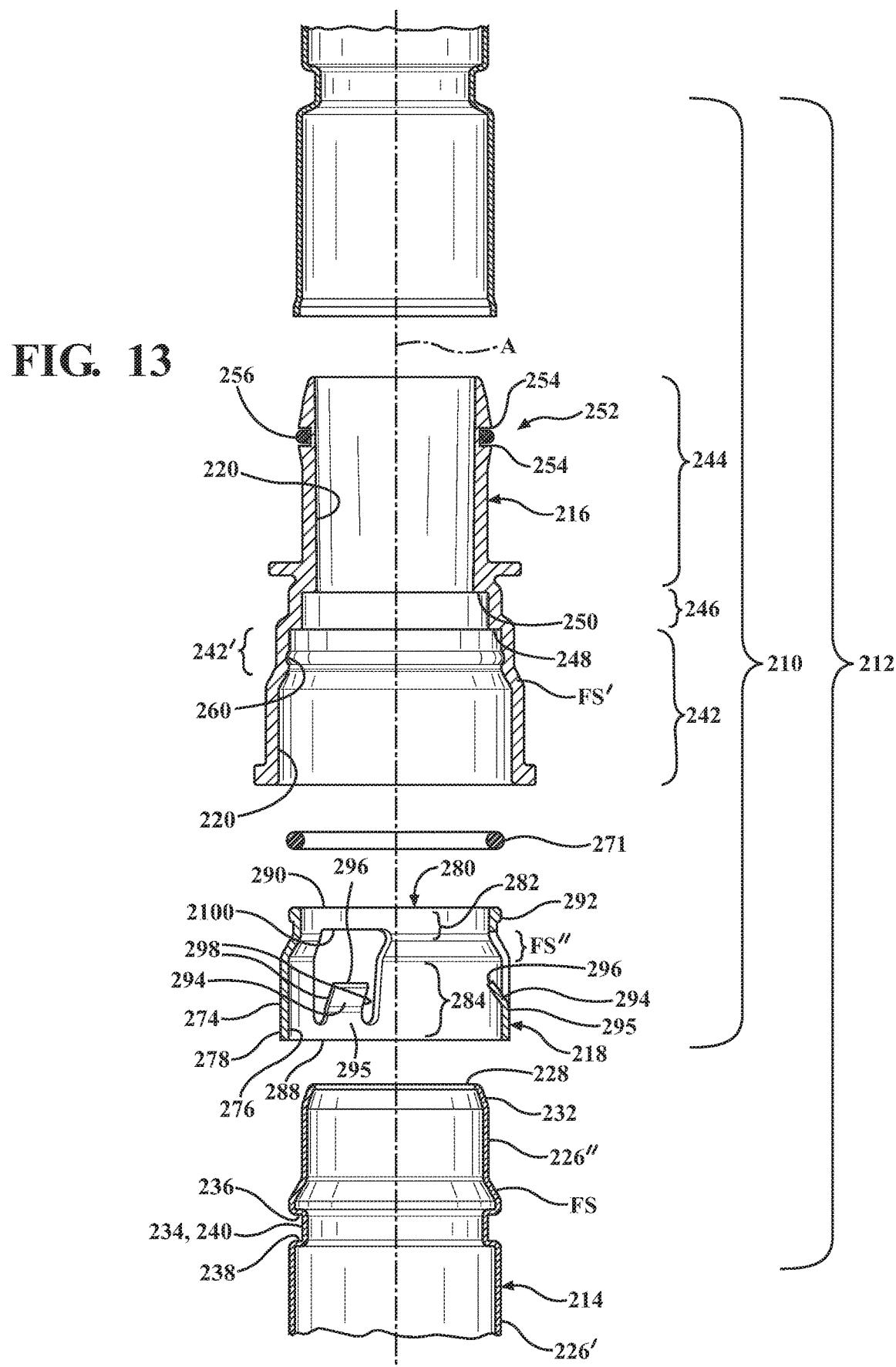
FIG. 13 is an exploded cross-sectional view of the quick connector assembly taken generally along the line 13-13 of FIG. 12.
Figure 14:
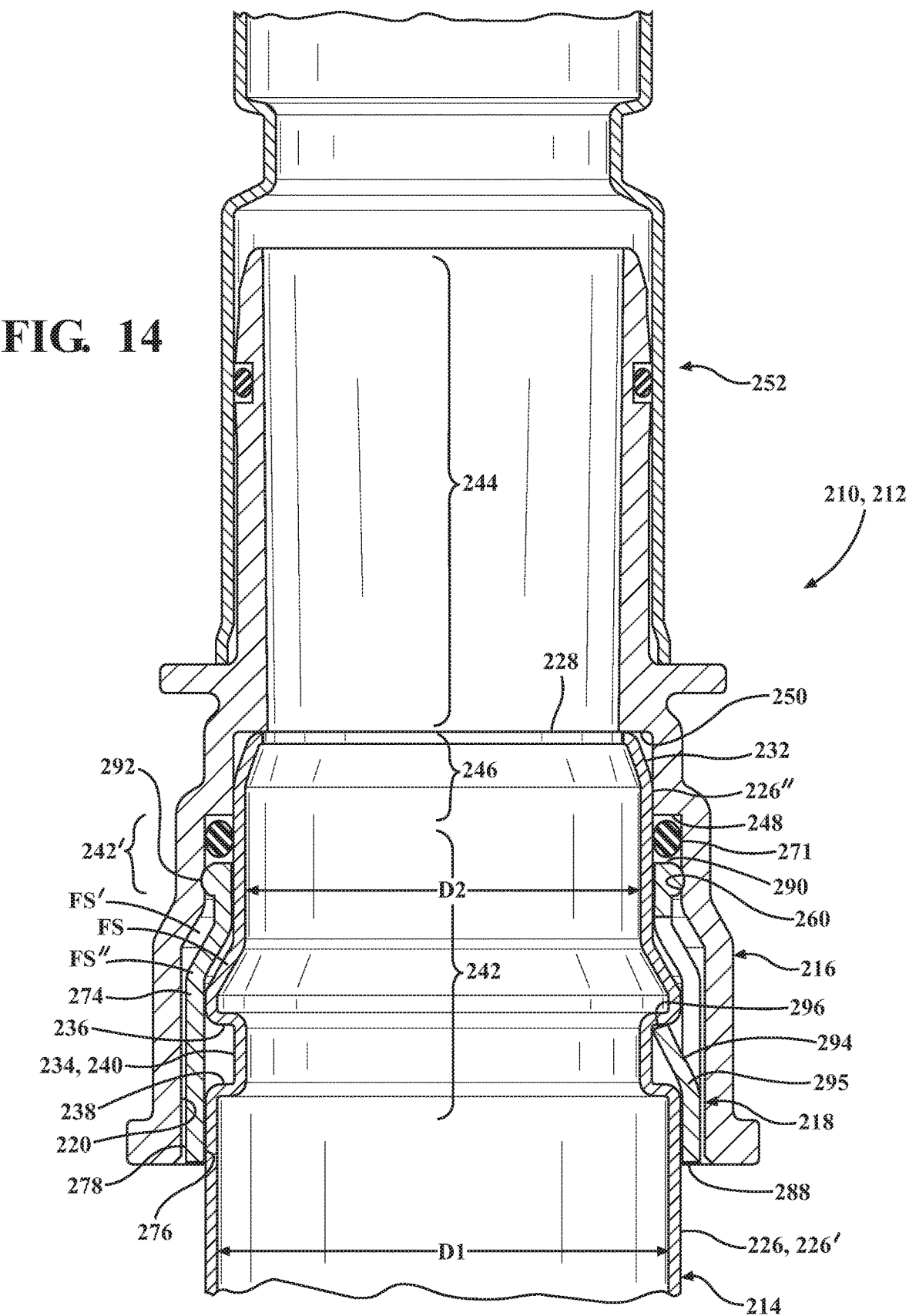
FIG. 14 is an assembled cross-sectional view of the components of FIG. 13.

In FIGS. 11-14, another quick connector 210 and assembly 212 therewith or components thereof are illustrated in accordance with another non-limiting embodiment of the disclosure, wherein the same reference numerals, offset by a factor of 200, are used to identify like parts and features. The quick connector 210 provides a reliable, fluid/gas-tight connection between an insertion member 214 of the assembly 212 and a housing 216 via an intermediate retaining member 218 and a resilient annular seal, such as an O-ring 271, similarly as discussed above. Accordingly, the improved quick connector 210 does away with the need for costly supplemental features and/or mechanisms to ensure and indicate the permanent, leak-proof connection is made and maintained. The connector 210 is economical in manufacture, in assembly and in use, and provides a quick, reliable way in which to ensure a permanent fluid/gas-tight connection is established between components of the assembly 212 and conduits connected thereto. The connection is maintained between the male insertion member 214 and the housing 216, with reassurance that any potential for inadvertent disconnection therebetween and tampering therewith is prevented.

The tubular insertion member 214 has a tubular shaft portion 226 extending between a distal insertion end 228 and a proximal attachment end 230. An annular, recessed groove, also referred to as collar 234, extends radially into the tubular shaft portion 226, with the collar 234 having respective leading and trailing shoulders 236, 238 and an inner periphery 240 extending between the shoulders 236, 238. The inner periphery 240 is shown as being annular and generally cylindrical, while the shoulders 236, 238 are shown extending radially and generally transversely to the inner periphery 240. The tubular shaft portion 226 is shown (FIG. 14) as having a generally cylindrical first outer 226' surface having a first diameter D1 extending from the attachment end 230 toward the insertion end 228, wherein the collar 234 is formed in the first outer surface 226', and having a generally cylindrical second outer surface 226" having a second diameter D2 extending generally from the collar 234 to the insertion end 228, wherein the second diameter D2 is less than the first diameter D1. A generally frustroconical surface FS is shown transitioning the first outer surface 226' to the second outer surface 226" and a rounded or tapered nose 232 extends from the second outer surface 226" to the insertion end 228.

The housing 216 includes a tubular wall 222 having an enlarged diameter, cylindrical first receiving portion 242, a reduced diameter, cylindrical second portion 244, with an intermediate diameter cylindrical, third portion 246 extending between the first and second cylindrical portions 242, 244. The first receiving portion 242 is further shown as having a slightly reduced diameter cylindrical portion 242' extending to the third portion 246, wherein a frustroconical tapered portion FS' transitions the portions 242, 242' with one another. An internal annular upper shoulder 248 (FIGS. 13 and 14) separates the upper cylindrical first receiving portion 242 from the intermediate cylindrical third portion 246, wherein the upper shoulder 248 extends from the reduced diameter portion 242' to the intermediate third portion 246. An internal annular lower shoulder 250 separates the lower second cylindrical portion 244 from the intermediate third cylindrical portion 246.

The tubular wall 222 has a coupling portion 252. The coupling portion 252 includes annular ridges 254 and an annular seal member 256, and is the same or substantially the same as discussed above for the coupling portion 52, and thus, further discussion is believed unnecessary. The enlarged diameter receiving portion 242 extends to an open end 258, with the slightly reduced diameter portion 242' having a locking feature, shown in a non-limiting embodiment as a circumferentially extending locking groove 260 extending radially outwardly into an inner surface 220 thereof. The locking groove 260 is shown as extending about the entire periphery of the inner surface 220, thereby forming a complete annular ring, by way of example and without limitation. The locking groove 260 is spaced axially from the upper shoulder 248 sufficiently to accommodate the O-ring 271 between the groove 260 and the shoulder 248.

The retaining member 218 includes a generally annular, tubular retainer wall, and shown as a generally cylindrical wall 274, having an inner surface 276 and an outer surface 278. The inner surface 276 of the wall 274 defines a bore, also referred to as through opening 280. The through opening 280 has a first portion, also referred to as distal or lower portion 282, and a second portion, also referred to as proximal or upper portion 284, with an annular frustroconical surface FS" extending therebetween. The lower portion 282 is sized for close fitting receipt of the second outer surface 226" of the insertion member 214 therein, but not the collar 234, while the upper portion 284 is sized of close fitting receipt of the first outer surface 226' of the insertion member 214 and the collar 234 therein.

The inner and outer surfaces 276, 278 of the retaining member 218 extend axially about the central longitudinal axis A between opposite open proximal and distal ends 288, 290. The retainer wall 274 has a locking member 292 configured for locking engagement with the annular locking feature 260 in the housing 216. The locking member 292 is shown, by way of example and without limitation, as circumferentially extending locking rib extending radially outwardly from the distal end 290, and is further shown in a non-limiting embodiment as a circumferentially continuous annular rib. The locking member 292 is configured for snapping receipt within the locking groove 260 in the housing 216. Accordingly, the locking member 292 extends radially outwardly from the outer surface 278 sufficiently for snapping, locked receipt within the locking groove 260, and thus, it is to be understood the annular locking rib 292 has a minimum outer diameter that is greater than a maximum diameter of the locking groove 260.

The retainer wall 274 further includes at least one, and shown as a plurality of locking fingers 294 extending radially inwardly from the inner surface 276, wherein the locking fingers 294 are configured for locked engagement within the collar 234 of the insertion member 214. The locking fingers 294 are shown as being spaced equidistantly from one another about the circumference of the wall 274, with three, by way of example and without limitation, being shown in circumferentially spaced relation with one another. The locking fingers 294 are shown as extending along a radially inwardly inclined path from a fixed end 295 adjacent the proximal end 288 along an axially and radially inwardly extending direction toward the distal end 290 to free ends 296. Accordingly, the locking fingers 294 converge toward one another and toward the central longitudinal axis A. The locking fingers 294 are cantilevered from their fixed ends 295, and thus, have opposite free sides 298 that extend from the fixed ends 295 to the free ends 296. As such, the locking fingers 294 are substantially detached from the wall 274, other than at their fixed ends 295, and are surrounded by respective openings 2100 in the wall 274. The locking fingers 294 extend radially inwardly to an extent that the free ends 296 confront the collar 234 along an axial direction to prevent removal of the insertion member 214 upon assembly of the insertion member 214 through the retaining member 218 and into the housing 216, as discussed further below.

In assembly, with the O-ring 271 disposed against or adjacent the upper shoulder 248, the locking member 292 of the retaining member 218 is disposed axially into the receiving portion 246 of the housing 216 along the longitudinal central axis A. The locking member 292 is biased resiliently and elastically radially inwardly along the frustroconical section FS' and then forcibly slid into radially outwardly snapping receipt within the locking groove 260. As such, the retaining member 218, with the locking member 292 disposed and fixed within the locking groove 260, is prevented from being removed from the housing 216.

Then, with the retaining member 218 fixed in the assembled state within the housing 216, the insertion member 214 is disposed axially along the axis A, through the retaining member 218, into the housing 216. The insertion end 228 of the insertion member 214 is inserted through the O-ring 271, wherein the rounded nose 232 facilitates sliding therethrough, and into the intermediate third portion 246 of the housing 216, wherein the O-ring 271 is radially compressed between the housing 216 and the tubular shaft portion 226" of the insertion member 228 to form a gas/fluid-tight seal therebetween. Additionally, the frustroconical surface FS of the collar 234 deflects the locking fingers 294 to resiliently bias the locking fingers 294 radially outwardly. Then, upon the collar 234 being moved into radial alignment with the free ends 296 of the locking fingers 294, the locking fingers 294 automatically snap resiliently radially inwardly, whereupon the free ends 296 are brought into position to confront the leading shoulder 236 of the collar 234 against return axial movement outwardly from the retaining member 218. Accordingly, the leading shoulder 236 of the collar 234 is permanently captured against axial separation from the retaining member 218 by the locking fingers 294. Further, the close fit of the tubular shaft portion 226 against the inner surface 276 of the retaining member lower portion 282 prevents the inward deflection of the locking member 292, thereby assuring the locking member 292 remains fixed in locked receipt within the locking groove 260.

If any axially applied force is applied between the insertion member 214 and the housing 216, tending to bias the insertion member 214 axially outwardly from the housing 216, the free ends 296 of the radially inwardly extending locking fingers 294 confront and abut the leading shoulder 236, wherein the pressure applied against the free ends 296 and along the axially extending length of the fingers 294 tends to bias the locking fingers 294 further radially inwardly, which is promoted by the radially inward inclination of the locking fingers 294, further locking the insertion member 214 against removal. Accordingly, reassurance is provided that the locked connection is maintained between the insertion member 214 and the housing 216, absent the axially applied force being strong enough to break a component or components of the assembly 212, and as such, no additional assurances, such as sensors, secondary fixing members and the like, are needed to ensure the connection is made and maintained.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A quick connector for permanently locked, non-disconnectable receipt of a tubular male insertion member, having a lock feature located between opposite ends, therein to facilitate establishing a tamper-resistant connection between conduits, comprising:

a housing having a tubular housing wall with an inner surface and an outer surface extending along a central longitudinal axis between open opposite ends with at least one locking feature extending into said inner surface of said housing wall, said inner surface bounding a through bore and having a shoulder extending radially inwardly from at least a portion thereof; and a retaining member having an annular, tubular retainer wall with inner and outer surfaces extending axially along said central longitudinal axis between open proximal and distal ends, said outer surface of said retaining member being sized for receipt in said through bore of said housing wall, said retainer wall having at least one locking member extending radially outwardly from said outer surface of said retainer wall for lock engagement with said at least one locking feature in said housing wall to prevent relative axial movement between said housing wall and said retaining member, said retainer wall having at least one locking finger extending radially inwardly from said inner surface of said retainer wall for locked engagement with the lock feature of the tubular male insertion member to prevent removal of said tubular male insertion member from said housing, wherein said at least one locking finger extends from a fixed end adjacent said proximal end axially toward said distal end in at least one of axially spaced and circumferentially spaced relation from said at least one locking member wherein said at least one locking feature extending into said inner surface of said housing wall is a through opening;

wherein said at least one locking member is provided as a protrusion extending radially outwardly from said annular retainer wall;

wherein said inner surface of said tubular housing wall has a recessed channel extending axially from one of said open opposite ends toward said through opening, said recessed channel being configured to guide said protrusion into said through opening.

2. The quick connector of claim 1, wherein said at least one locking feature extending into said inner surface of said housing wall includes a plurality of through openings.

3. The quick connector of claim 1, further including a ramped surface extending radially inwardly from said recessed channel toward said through opening.

4. A quick connector for permanently locked, non-disconnectable receipt of a tubular male insertion member, having a lock feature located between opposite ends, therein to facilitate establishing a tamper-resistant connection between conduits, comprising:
a housing having a tubular housing wall with an inner surface and an outer surface extending along a central longitudinal axis between open opposite ends with at least one locking feature extending into said inner surface of said housing wall, said inner surface bounding a through bore and having a shoulder extending radially inwardly from at least a portion thereof; and
a retaining member having an annular, tubular retainer wall with inner and outer surfaces extending axially along said central longitudinal axis between open proximal and distal ends, said outer surface of said retaining member being sized for receipt in said through bore of said housing wall, said retainer wall having at least one locking member extending radially outwardly from said outer surface of said retainer wall for lock engagement with said at least one locking feature in said housing wall to prevent relative axial movement between said housing wall and said retaining member, said retainer wall having at least one locking finger extending radially inwardly from said inner surface of said retainer wall for locked engagement with the lock feature of the tubular male insertion member to prevent removal of said tubular male insertion member from said housing, wherein said at least one locking finger extends from a fixed end adjacent said proximal end axially toward said distal end in at least one of axially spaced and circumferentially spaced relation from said at least one locking member;
wherein said at least one locking finger is cantilevered from said fixed end.

5. The quick connector of claim 4, wherein said at least one locking finger includes a plurality of locking fingers spaced equidistantly from one another about a circumference of said annular retainer wall.

6. A quick connector for permanently locked, non-disconnectable receipt of a tubular male insertion member, having a lock feature located between opposite ends, therein to facilitate establishing a tamper-resistant connection between conduits, comprising:
a housing having a tubular housing wall with an inner surface and an outer surface extending along a central longitudinal axis between open opposite ends with at least one locking feature extending into said inner surface of said housing wall, said inner surface bounding a through bore and having a shoulder extending radially inwardly from at least a portion thereof; and
a retaining member having an annular, tubular retainer wall with inner and outer surfaces extending axially along said central longitudinal axis between open proximal and distal ends, said outer surface of said retaining member being sized for receipt in said through bore of said housing wall, said retainer wall having at least one locking member extending radially outwardly from said outer surface of said retainer wall for lock engagement with said at least one locking feature in said housing wall to prevent relative axial movement between said housing wall and said retaining member, said retainer wall having at least one locking finger extending radially inwardly from said inner surface of said retainer wall for locked engagement with the lock feature of the tubular male insertion member to prevent removal of said tubular male insertion member from said housing, wherein said at least one locking finger extends from a fixed end adjacent said proximal end axially toward said distal end, and wherein said at least one locking feature is a circumferentially extending groove extending radially outwardly into said inner surface of said housing wall;
wherein said at least one locking member is a circumferentially extending rib extending radially outwardly from said outer surface of said retainer wall;
wherein said rib extends about an entirety of the circumference of said outer surface of said retainer wall.

7. A quick connector assembly, comprising:
a tubular male insertion member having opposite ends with a lock feature located between said opposite ends;
a housing having a tubular housing wall with an inner surface and an outer surface extending about a central longitudinal axis between open opposite ends with at least one locking feature extending into said inner surface of said housing wall, said inner surface bounding a through bore and having a shoulder extending radially inwardly from at least a portion thereof; and
a retaining member having an annular, tubular retainer wall with inner and outer surfaces extending axially about said central longitudinal axis between open proximal and distal ends, said outer surface of said retaining member being sized for receipt in said through bore of said housing wall, said retainer wall having at least one locking member extending radially outwardly from said outer surface of said retainer wall for lock engagement with said at least one locking feature in said housing wall to prevent relative axial movement between said housing wall and said retaining member, said retainer wall having at least one locking finger extending radially inwardly from said inner surface of said retainer wall for locked engagement with said lock feature of said tubular male insertion member to prevent removal of said tubular male insertion member from said housing, wherein said at least one locking finger extends from a fixed end adjacent said proximal end axially toward said distal end in at least one of axially spaced and circumferentially spaced relation from said at least one locking member;
wherein said at least one locking feature extending into said inner surface of said housing wall is a through opening;
wherein said at least one locking member is provided as a protrusion extending radially outwardly from said annular retainer wall;
wherein said inner surface of said tubular housing wall has a recessed channel extending axially from one of said open opposite ends toward said through opening, said recessed channel being configured to guide said protrusion into said through opening.

8. The quick connector assembly of claim 7, wherein said at least one locking feature extending into said inner surface of said housing wall includes a plurality of through openings.

9. The quick connector assembly of claim 7, further including a ramped surface extending radially inwardly from said recessed channel toward said through opening.

10. The quick connector assembly of claim 7, wherein said tubular male insertion member has a generally cylindrical outer surface and said lock feature extends radially outwardly from said generally cylindrical outer surface.

11. The quick connector assembly of claim 10, wherein said lock feature is an annular collar having a leading shoulder, a trailing shoulder and an outer periphery extending between said leading shoulder and said trailing shoulder.

12. A quick connector assembly, comprising:
  a tubular male insertion member having opposite ends with a lock feature located between said opposite ends;
  a housing having a tubular housing wall with an inner surface and an outer surface extending about a central longitudinal axis between open opposite ends with at least one locking feature extending into said inner surface of said housing wall, said inner surface bounding a through bore and having a shoulder extending radially inwardly from at least a portion thereof; and
  a retaining member having an annular, tubular retainer wall with inner and outer surfaces extending axially about said central longitudinal axis between open proximal and distal ends, said outer surface of said retaining member being sized for receipt in said through bore of said housing wall, said retainer wall having at least one locking member extending radially outwardly from said outer surface of said retainer wall for lock engagement with said at least one locking feature in said housing wall to prevent relative axial movement between said housing wall and said retaining member, said retainer wall having at least one locking finger extending radially inwardly from said inner surface of said retainer wall for locked engagement with said lock feature of said tubular male insertion member to prevent removal of said tubular male insertion member from said housing, wherein said at least one locking finger extends from a fixed end adjacent said proximal end axially toward said distal end in at least one of axially spaced and circumferentially spaced relation from said at least one locking member;
  wherein said at least one locking finger is cantilevered from said fixed end.

13. The quick connector assembly of claim 12, wherein said at least one locking finger includes a plurality of locking fingers spaced equidistantly from one another about a circumference of said annular retainer wall.

14. The quick connector assembly of claim 13, wherein said at least one locking feature is a circumferentially extending groove extending radially outwardly into said inner surface of said housing wall.

15. The quick connector assembly of claim 14, wherein said at least one locking member is a circumferentially extending rib extending radially outwardly from said outer surface of said retainer wall.

* * * * *